US009938125B2

(12) United States Patent  
Randall

(10) Patent No.: US 9,938,125 B2  
(45) Date of Patent: Apr. 10, 2018

(54) LEVER ADAPTER FOR USE WITH JACK AND LIFTING DEVICES

(71) Applicant: Steve Randall, Renton, WA (US)

(72) Inventor: Steve Randall, Renton, WA (US)

( * ) Notice: Subject to any disclaimer, the term of this patent is extended or adjusted under 35 U.S.C. 154(b) by 0 days.

(21) Appl. No.: 15/627,316

(22) Filed: Jun. 19, 2017

(65) Prior Publication Data

US 2017/0362069 A1  Dec. 21, 2017

Related U.S. Application Data

(60) Provisional application No. 62/352,092, filed on Jun. 20, 2016.

(51) Int. Cl.
*B66F 5/04* (2006.01)
*B66F 13/00* (2006.01)

(52) U.S. Cl.
CPC .................................. *B66F 13/00* (2013.01)

(58) Field of Classification Search
CPC ...... B66F 1/00; B66F 3/00; B66F 5/00; B66F 7/00; B66F 9/00
See application file for complete search history.

(56) References Cited

U.S. PATENT DOCUMENTS

| | | | |
|---|---|---|---|
| 3,286,985 A * | 11/1966 | Edera | B66F 3/42 254/2 B |
| 3,618,894 A | 11/1971 | Meyer | |
| 3,843,147 A * | 10/1974 | Fredricson | B62B 3/0618 254/8 C |
| 4,388,037 A * | 6/1983 | Suarez | B62B 3/0618 280/43.12 |
| 4,497,501 A * | 2/1985 | Kedem | B62B 3/0618 254/2 R |
| 4,589,669 A * | 5/1986 | Kedem | B62B 3/0618 254/2 R |
| 4,594,048 A | 6/1986 | Sipla | |
| 6,109,593 A | 8/2000 | Craychee | |
| 8,251,349 B2 | 8/2012 | Drake | |
| 8,814,142 B2 | 8/2014 | Pasto et al. | |
| 2006/0125196 A1* | 6/2006 | Hartmann | B62B 3/001 280/43.12 |

* cited by examiner

*Primary Examiner* — Lee D Wilson
(74) *Attorney, Agent, or Firm* — Bold IP, PLLC; Christopher Mayle; Houda El-Jarrah

(57) ABSTRACT

Embodiments in the present description are provided for a lever adapter device for use in lifting a vehicle or other heavy objects. The lever adapter device includes stabilizing feet and one or more support legs. Each one of the stabilizing feet is attached to an end of each support leg. The lever adapter device further includes a hinge disposed at an end of each support leg. Each support leg is extendable and retractable towards or away from the other support leg. The lever adapter device further includes a jack attachment piece and one or more hinges, which are also connected to the one or more support legs. The jack attachment piece is configured to be removably connected to a jack, such as a HI-LIFT jack, or to other lifting devices to assist in lifting the vehicle or the other heavy objects.

20 Claims, 11 Drawing Sheets

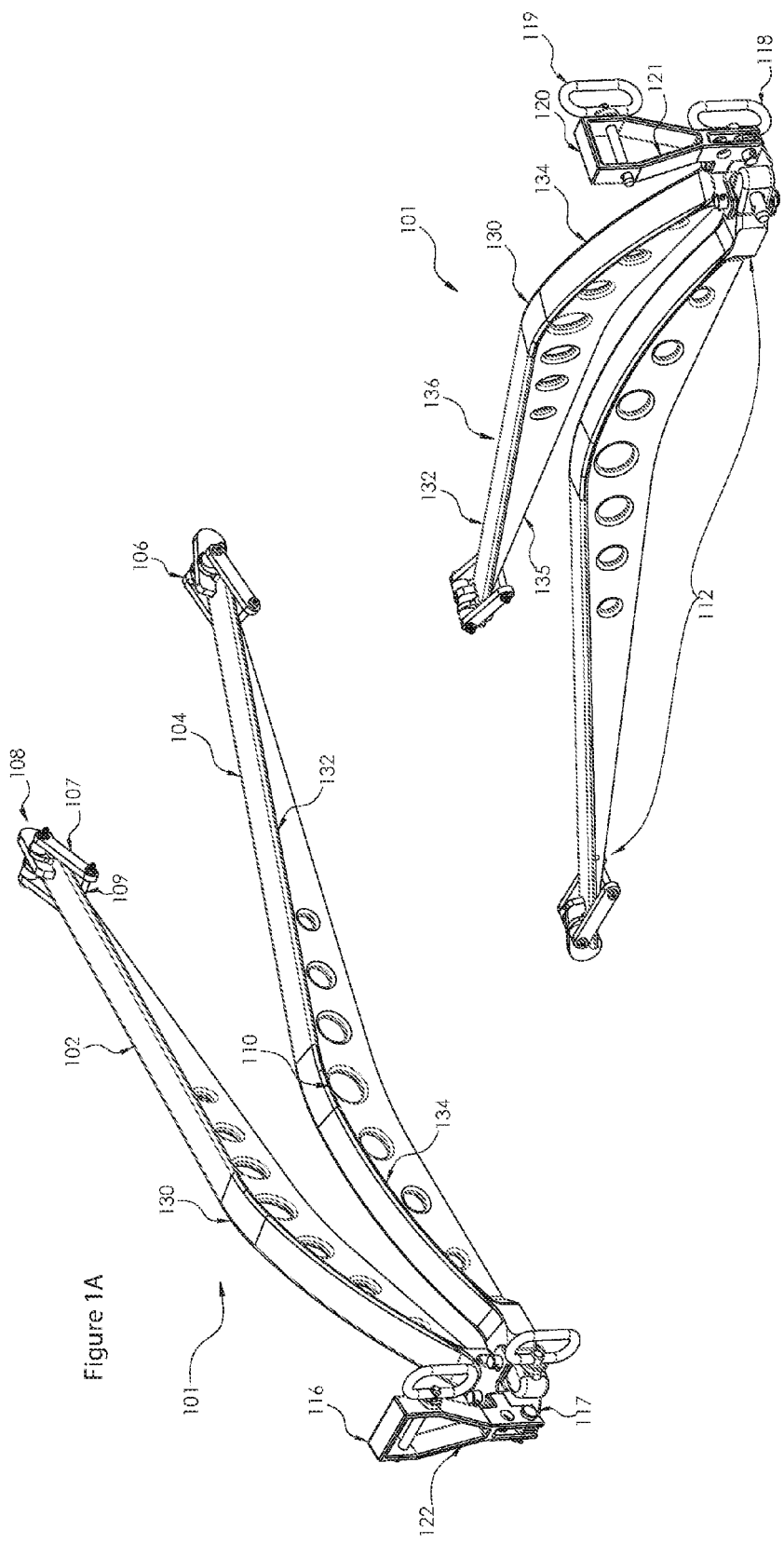

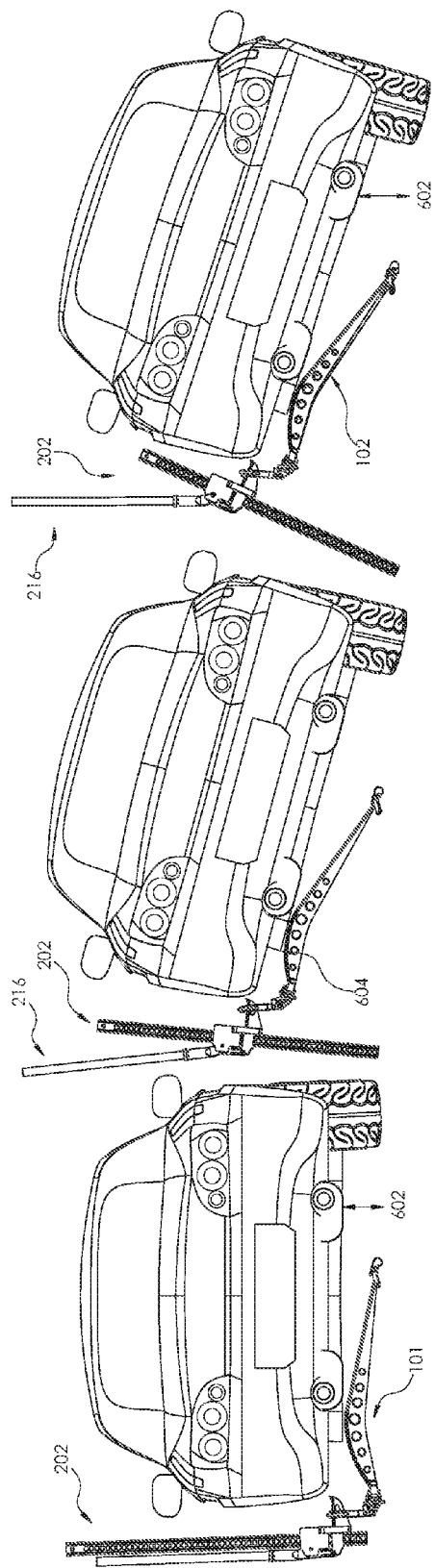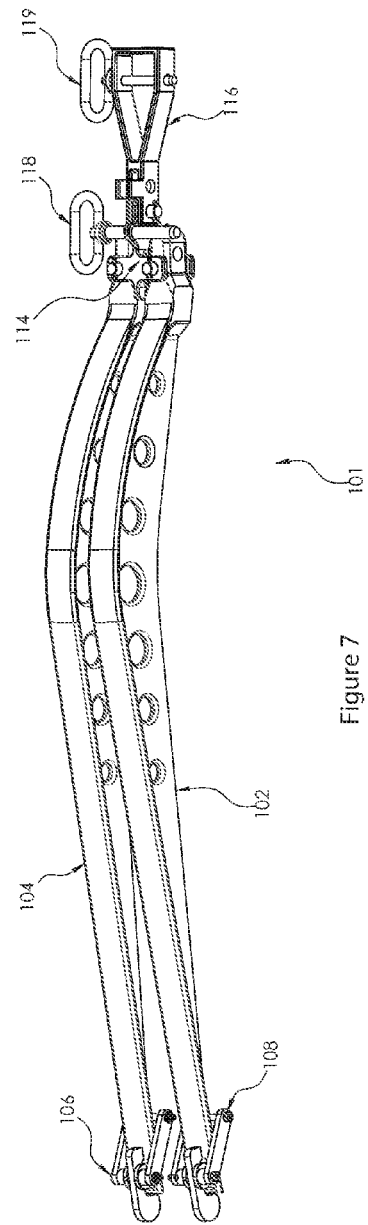

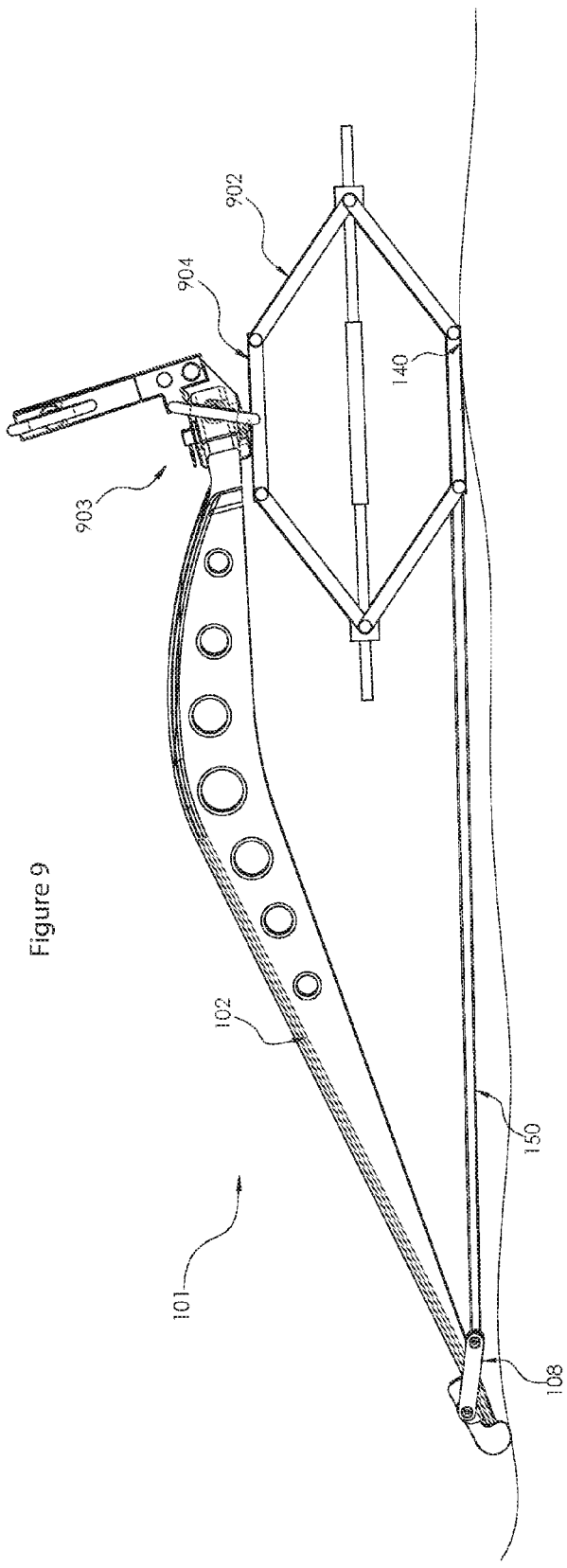

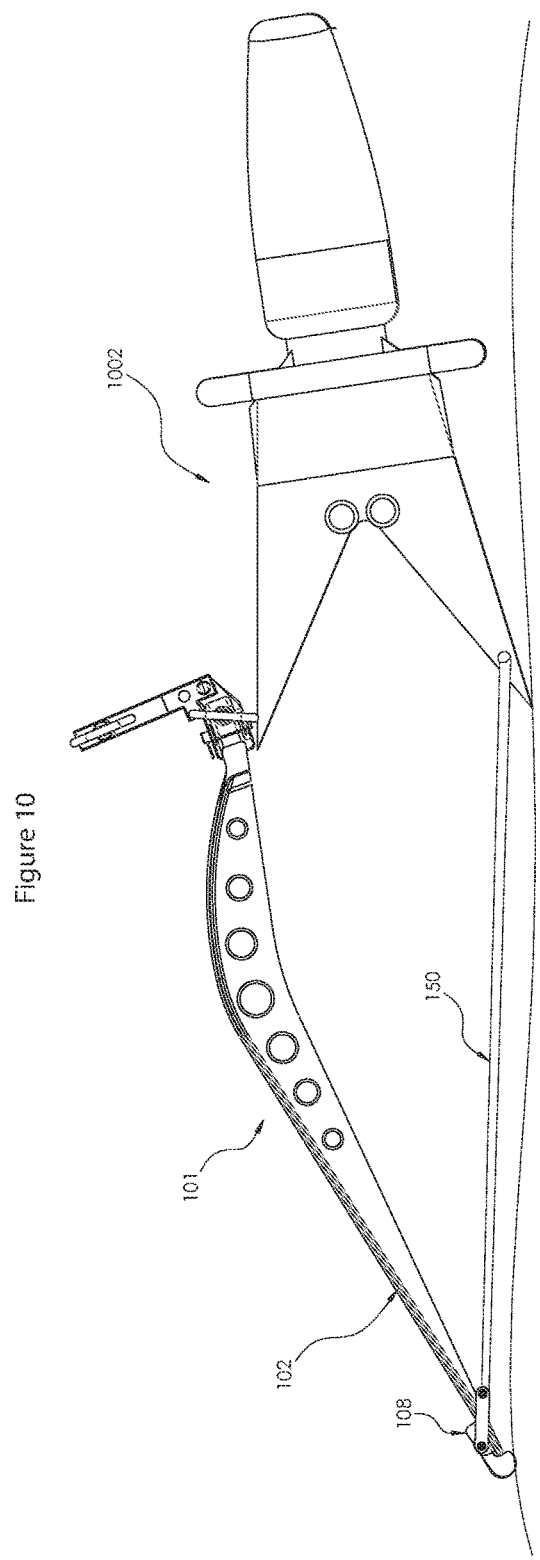

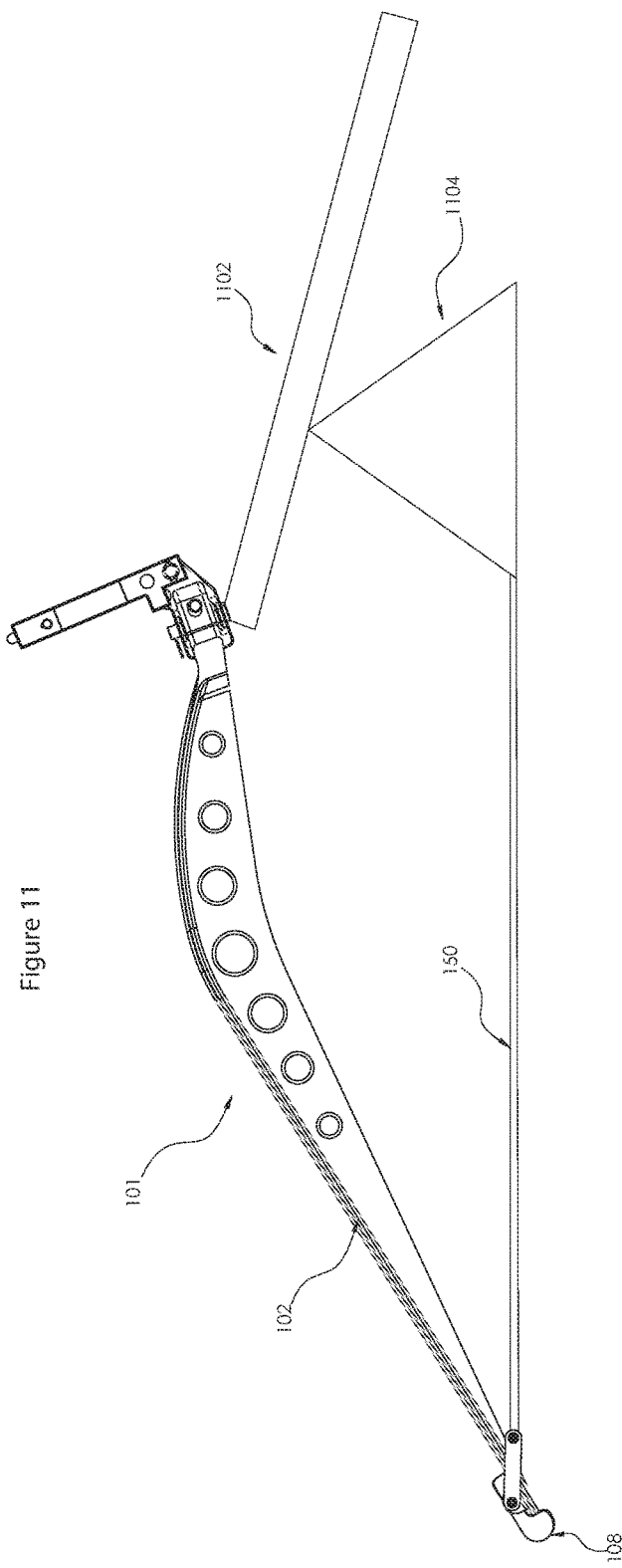

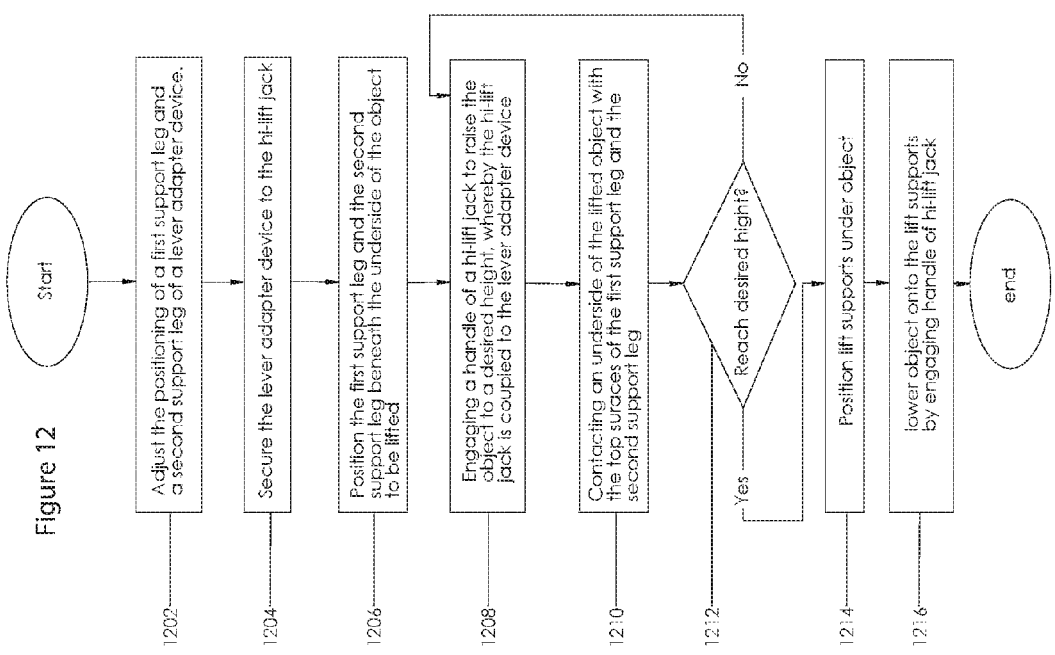

LEVER ADAPTER FOR USE WITH JACK AND LIFTING DEVICES

CROSS REFERENCE TO RELATED APPLICATIONS

This application claims priority to a prior-filed provisional application Ser. No. 62/352,092, filed on Jun. 20, 2016.

FIELD OF THE DISCLOSURE

The field of invention generally relates to a portable and universal lever adapter device. More specifically, the present description includes embodiments for a tool that may be used to assist in lifting vehicles when coupled to a variety of jacks or other lifting and rescue devices.

BACKGROUND

Jacks and other lifting type devices are commonly used to facilitate access to the underside of vehicles or such objects for repairs, maintenance, and emergencies. When an automobile, truck or other motor vehicle is involved in an accident, there are occasions when the vehicle comes to rest on its side or its roof, for example, on a person, or against an object, such as a tree, utility pole or another vehicle. Emergency responders, including firefighters and first responders, understand the plethora of difficulties involved in rescuing individuals trapped under vehicles and other heavy objects, such as fallen trees, walls, and poles. In such situations, the vehicles or other heavy object must be stabilized and lifted to allow rescue personnel to remove the driver and passengers, and any victim trapped beneath the vehicle. Moreover, in order to prevent further injury to the occupants of the vehicle or rescue personnel, or further damage to the vehicle itself, the vehicle usually must be stabilized and lifted in the position at which it has come to rest.

Jacks and other such lifting devices, while simple, inexpensive, and relatively portable, place the emergency rescuer, firefighter, police and law enforcement personnel, or any other type of individual in a crowded, inconvenient, and frequently dangerous position. Existing jacks and other such lifting devices, have a variety of downfalls. For example, many jacks only have a single contact and load point structure. Depending on a variety of factors, the single contact point structure and the single load point structure may put the vehicle in an unstable and unsafe position when lifted. There may be inadvertent slippage of the vehicle or the jack. Further, the undercarriage of many vehicles is close to the ground, and consequently, even with crawlers, jacks, and ramps, access is inconvenient and somewhat difficult, forcing one to creep beneath the car in a supine position or to aid someone with injuries. Another problem includes the inconvenience of needing to install or attach lifting devices.

The airbag method is an alternative to using the existing car jacks and lifts. The airbag method is often used by the rescue community when lifting a vehicle that has come to rest on top of a pedestrian, vehicle passenger, or bicycle rider. The airbag method involves a number of steps that require multiple people and pieces of equipment that must be prepared beneath a vehicle or other object before the air bags are able to effectively raise the vehicle or other object high enough off of the ground to allow clearance to rescue any individuals trapped beneath the vehicle or other object. The air bag lift method requires using multiple specialty air bags, whereby a first air bag is inflated individually with air and then another airbag may be placed over the first and inflated.

A disadvantage of the air bag method is that multiple components and time is needed for implementation. For example, it is estimated that the airbag method requires three highly trained firefighters and first responders at least three to five rescue man minutes (which translates to nine to fifteen rescuer minutes) for transporting of equipment, setup, and connections of the many components. This may then translate to ten to twelve rescuer minutes for an emergency responder to successfully assist and extract a trapped individual. In an emergency rescue operation, time is of the essence and anything that may be done to increase the speed as well as maintain the safety of those involved in an emergency rescue is needed. A further disadvantage of the airbag methods is that two (2) airbags are the limit unless an additional lifting platform and support scribbing are utilized. Further, multiple man minutes are needed to lift an object over 12 inches using the airbags.

Various attempts have been made to provide alternatives to existing methods and techniques of lifting vehicles or other heavy objects. Previously filed patents exists that describe such methods and techniques for lifting vehicles or other heavy objects, however, they do not provide an adequate solution for a quick and convenient response when a vehicle or other object must be lifted as quickly as possible, such as during emergency rescue operations. For example, U.S. Pat. No. 4,594,048 describes a method of lifting a vehicle that uses two J-shaped members that are tied together and used to flip rotate a car through more than 90 degrees. However, it is noted that the J-Shaped members described in U.S. Pat. No. 4,594,048 are large and bulky and must be attached to front and rear wheels. Further, U.S. Pat. No. 4,594,048 teaches that the vehicle must first be jacked-up using a body jack. U.S. Pat. No. 4,594,048 is primarily used for maintenance of a vehicle to allow access to both an underside and a top of a vehicle and would not be useful or realistic if used during emergency rescue operations where timely and easy techniques must be used to access an individual in distress beneath a vehicle or other heavy object.

U.S. Pat. No. 3,618,894 describes using a manually operated, wheeled hydraulic lift that is coupled to a beam at one end by a chain. Centered on the beam is a raised assembly that makes contact with a vehicle during lifting, when the manually operated hydraulic lift is activated. U.S. Pat. No. 3,618,894 fails to describe however a mechanism for lifting a vehicle that would be readily available for rescue operations that require quick lifts and portable components that could be easily transported on a fire truck or other vehicle.

Despite the various designs and types of jacks, lifts, or supports that are presently available, there still exist numerous drawbacks and problems that have not been addressed by the presently available options. Therefore, a portable and universal safety lever adapter device would be very useful to a wide spectrum of users, primarily anyone that aids those in emergency situations in various locations.

SUMMARY

Embodiments for a lever adapter device for use in lifting vehicles or other heavy objects are provided in the present description. In one embodiment, the lever adapter device includes one or more stabilizing feet, whereby each of the one or more stabilizing feet has a frame that defines an opening. The lever adapter device may further include one or more support legs. Each of the one or more stabilizing feet may be attached to the distal end of each support leg. The lever adapter device may further include one or more hinges disposed at the terminal end of each support leg, whereby each support leg is connected to the one or more hinges at the terminal end of each support leg. Further, each support leg may be extendable and retractable towards or away from the other one or more support legs. The lever adapter device may further include a jack attachment piece, whereby the jack attachment piece has a frame that defines a central opening.

The frame of the jack attachment piece, in one embodiment, may include a number of slots configured to receive position locking pins that extend through the frame and through the central opening of the jack attachment piece. When the jack attachment piece is in a deployed position, the jack attachment piece is configured to be removably connected to a jack or to other lifting devices in order to assist in lifting the vehicle or the other heavy objects. In some embodiments, the one or more support legs are curved and include an upwardly angling portion and a downwardly angling portion. In alternative configurations, the one or more support legs are straight and flat. The one or more support legs may be used to lift a vehicle when in an extended or a retracted position.

In another aspect, the lever adapter device is configured to be coupled to a jack, such as a HI-LIFT jack. The jack attachment piece may be coupled to a runner of the HI-LIFT jack, by using a position locking pin. Further, the lever adapter device may be coupled to a base plate and a strap, whereby the strap is connected to each one of the stabilizing feet. The strap may also be coupled to a frame of the base plate. Further, the base plate may be positioned beneath a bottom surface of a HI-LIFT jack, such that the one or more support legs are prevented from moving from a desired position when the strap is coupled to the base plate beneath the HI-LIFT jack.

In another aspect, a method of using a lever adapter device with a HI-LIFT jack when lifting a vehicle or a heavy object is provided in the present description. The method may include adjusting a position of a first support leg with respect to a second support leg disposed on the lever adapter device in a desired arrangement. The first support leg and the second support leg on the lever adapter device are elongated members. The lever adapter device may further include a first stabilizing foot connected to a distal end of the first support leg and a second stabilizing foot connected to a distal end of the second support leg. The lever adapter device may further include one or more hinges that connect to the first support leg and the second support leg, and further include a jack attachment piece that is also connected to the one or more hinges.

The first support leg and the second support leg on the lever adapter device are moveable towards and away from each other, because the first support leg and the second support leg are connectably joined together by the one or more hinges, in accordance with one or more embodiments. Next, the process may include securing the lever adapter device to the HI-LIFT jack. Further, the process may also include positioning the first support leg and the second support leg of the lever adapter device beneath the vehicle or the heavy object such that the first support leg and the second support leg are perpendicular to an underside of the vehicle or heavy object, and a bottom surface of the first support leg and a bottom surface of the second support leg makes contact with the ground.

Upon positioning the first support leg and the second support leg beneath the underside of the vehicle or the heavy object, the process may continue, in one or more embodiments, by engaging a handle of the HI-LIFT jack to raise the vehicle or the heavy object to a desired height while the HI-LIFT jack is also securely coupled to the lever adapter device. The HI-LIFT jack is also located proximate to the vehicle or the heavy object and to the first and second support leg of the lever adapter device as the handle of the HI-LIFT jack is engaged to raising the vehicle or other heavy object. Responsive to raising the vehicle or the heavy object to the desired height, a top surface of the first support leg and a top surface of the second support leg support the underside of the vehicle or the heavy object, whereby the top surfaces of the first support leg and the second support leg make physical contact with a portion of the underside of the vehicle. Upon reaching the desired height of the vehicle, the process may continue whereby lift supports may be placed under a lifted side of the vehicle or the heavy object. Subsequently, the vehicle or other heavy object may then be lowered onto the lift supports by engaging the handle of the HI-LIFT jack to lower the vehicle or the heavy object.

The preceding and following embodiments and descriptions are for illustrative purposes only and are not intended to limit the scope of this disclosure. Other aspects and advantages of this disclosure will become apparent from the following detailed description.

BRIEF DESCRIPTION OF THE DRAWINGS

The present invention will be described by way of exemplary embodiments, but not limitations, illustrated in the accompanying drawings in which like references denote similar elements, and in which:

FIG. 1A illustrates a perspective view of an embodiment of a lever adapter device.

FIG. 1B illustrates perspective view from another side of the embodiment of the lever adapter device shown in FIG. 1A.

FIG. 6A illustrates a deployed lever adapter device at an initial point in lifting a vehicle.

FIG. 6B illustrates a deployed lever adapter device at a middle point in lifting a vehicle.

FIG. 6C illustrates a deployed lever adapter device at an end point in lifting a vehicle.

FIG. 7 illustrates an embodiment of a lever adapter device in the stowed position.

FIG. 9 illustrates an embodiment of a lever adapter device connected to a scissor jack lift.

FIG. 10 illustrates an embodiment of a lever adapter device connected to a Jaws of Life device.

FIG. 11 illustrates an embodiment of a lever adapter device connected to a lever.

FIG. 12 illustrates a flowchart of a process for implementing a lever adapter device in accordance with an embodiment.

DETAILED DESCRIPTION

Figure 1D:
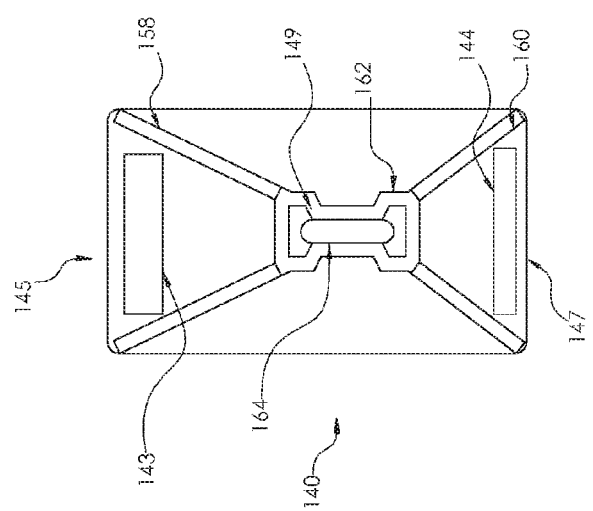
FIG. 1D illustrates the base plate shown in FIG. 1C.

In the Summary above, in this Detailed Description, the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined).

References in the singular tense include the plural, and vice versa, unless otherwise noted. Further, as used herein, the term "coupled" or "coupling" may indicate a connection. The connection may be a direct or an indirection connection between one or more items. Further, the term "set" as used herein may denote one or more of any item. Throughout the drawings, like reference characters are used to designate like elements. Further, the drawings are not to scale and depicted components or structures may have dimensions other than those depicted or perceived in the drawings.

The present disclosure recognizes the unsolved need for an apparatus and method that may be used to quickly and conveniently access the underside of a vehicle or other heavy object, particularly during emergency rescue operations. Each year, firefighters, first responders, and other individuals, risk their lives to rescue trapped individuals, such as bicyclists, motorists, or pedestrians, that may be pinned beneath a vehicle, wall, fallen tree, pole, or other heavy objects. During such emergency rescue operations, time is critical and it is essential that the firefighters and other first responders be able to lift or raise a vehicle in a matter of minutes to save someone located inside or beneath the vehicle. Existing methods and techniques usually require anywhere from five to ten rescuer minutes to implement and to effectively raise a vehicle to a height that allows firefighters or other emergency rescue personnel to access the underside of the vehicle, however there are many documented instances where it has taken much longer to access the underside of the vehicle.

To extract a trapped person from beneath a vehicle or other object, a firefighter or other first responder has to know how to quickly access the underside of the vehicle. Many vehicles, including sedans and mini-vans may only have a clearance of 5-7 inches. Any jack or mechanism used to try and lift the automobile has to be able to fit within this space located beneath the vehicle. There are many problems associated with existing jacks in that even after jacking up a vehicle, the vehicle is not lifted sufficiently high enough to provide adequate room to reach under and extract a person pinned or trapped beneath vehicle or another object. Further, the jacks often fail or fall over, because these jacks are unable to support the weight of the vehicle on their own.

Alternatively, the vehicle may be not be able to be lifted using existing jacks on their own, because the shape of the vehicle does not provide enough structural metal enough for a jack to confidently lift the vehicle on its own. This may be due to the fact that many vehicles have too much bow in their sidewall structure or may have plastic in the rocker panel (the space where the sidewall fits the undercarriage), which does not provide enough structural metal for a jack to fit under. Another major drawback of utilizing existing jacks on their own, including HI-LIFT jacks, is that these jacks have a small footprint and the higher that the jacks are required to lift, the less stable they become.

Thus, the present description includes embodiments for a lever adapter device that provides a number of benefits and advantages not found in conventional methods for lifting a vehicle or other heavy object. The present description includes embodiments generally drawn to a portable universal lever adapter device that may be particularly useful to aid in the lifting of a vehicle quickly, safely, and with a variety of existing jacks. Using the lever adapter device, as described herein, may significantly reduce the load carried by a jack, and effectively distribute the weight of a lifted vehicle or other object between the jack and the support legs of the lever adapter device, thus minimizing the load on the jack alone. Further, the lever adapter device, in accordance with one or more embodiments in the present description, provides much more stability when lifting a vehicle with a jack in combination with the lever adapter device, because of the "tripod" lift effect, whereby the legs of the lever adapter device support the underside of the vehicle at one or more contact points, and the jack also supports the underside of the vehicle at another contact point, often times forming a more stable triangular base when lifting the vehicle.

In one or more embodiments, a lever adapter device as described herein may be conveniently and easily transported from one place to another due to its compact size and optional attachment parts. Further, embodiments of the lever adapter device, as described herein, are particularly suited to accommodate different brands and types of jacks and other rescue related equipment. Advantageously, one or more embodiments herein describe a lever adapter device that is particularly suited for accommodating a HI-LIFT jack.

The different illustrative embodiments provided in the present description include a lever adapter device that has curved elongated support legs that act as a strong structural support for the underside of a raised load or object. The support legs are adapted to either move jointly or independently of each other, and may be positioned in a variety of ways. For instance, the curved elongated support legs may be connected to one another via one or more hinges, such that the support legs may be moveable towards and away from each other so as to be spread apart. Further, the support legs may be brought close together so as to be in straight alignment with each other. Alternatively, or additionally, the curved elongated support legs may be configured so that each support leg moves independently of the other such that each support leg may be disposed at a desired angle.

In addition to the above, embodiments of a lever adapter device may include stabilizing feet located at an end of each support leg that help prevent slippage of the lever adapter device. Other detachable components that may be used with a lever adapter device as described herein include a strap and a base plate. A strap may be used to provide additional contact with a HI-LIFT jack or other type of tool and to stabilize the curved support legs to keep the support legs from possible unwanted movement. A base plate may be used to connect the strap to the lever adapter device and/or another tool.

The different illustrative embodiments herein recognize that there is a need for an apparatus, such as the lever adapter device, that may be portable and easily transportable in a vehicle, such as a fire truck or another emergency vehicle. It is known that fire trucks and other emergency vehicles have very limited available space. The real estate on a fire truck is already claimed by the numerous firefighters and rescue personal, pieces of equipment, hoses, and rescue tools that must be accounted for on a fire truck, so there usually is not a great deal of space left over for another large and bulky tool or device. Accordingly, a lever adapter device, as described herein, beneficially, has a relatively compact size that can be easily stored without taking a great deal of space on a fire truck or other location. Further, a lever adapter device, in accordance with one or more embodiments in the present description, is relatively light weight such that one person can carry and use the lever adapter device by himself or herself.

The different illustrative embodiments also recognize the need for a tool that may speed up the process of lifting a heavy object or vehicle. Further, the different illustrative embodiments recognize the need for a tool that may be combined with a variety of types of jacks and lifting devices. It has been discovered, based on actual use of embodiments of a lever adapter device as described herein, that when combined with a HI-LIFT jack, it is possible for a single person to raise a vehicle (e.g. 3,200-4,500 pound vehicles) in approximately one minute. Thus, the lever adapter device, in accordance with one or more embodiments, may provide a much faster alternative than conventional lifting mechanisms or alternative methods, including the air bag method that emergency rescue teams currently use and which was previously discussed above.

Further, it is noted that while the lever adapter device is particularly useful and beneficial for firefighters and other first responders during emergency rescue operations, the lever adapter device may be used by any individual in a variety of scenarios, and is not limited to use for emergency rescue operations. It is foreseeable that the lever adapter device may be used anytime to raise or lift any type of heavy object, including, but not limited to, vehicles, trees, poles, walls, equipment, furniture, etc. Additional details regarding one or more embodiments of a lever adapter device as discovered and described in the present description are provided below.

Referring to FIG. 1A, FIG. 1A provides a perspective view of an embodiment of a lever adapter device. FIG. 1B shows another side of the lever adapter device shown in FIG. 1A. Lever adapter device 101 may be used as a support tool (or in some cases the primary tool) to raise a vehicle or other heavy object to a desired height (e.g. as shown in FIGS. 6A-6C). The term "vehicle" as used herein may refer to any type of vehicle, including automobiles, trucks, buses, or any type of wheel-based vehicles, special track vehicles, or other driven vehicles. This further includes, without limitation, motorcycles and/or other two or three wheeled vehicles.

Lever adapter device 101, as shown in FIGS. 1A and 1B, may include, in one or more embodiments, support legs 102 and 104. Support leg 102 and support leg 104 may be curved or curvilinear, elongated members. Support legs 102 and 104 may be made of any suitable material known in the art, including, but not limited to, metal, plastics, or a combination thereof. Preferably, support legs 102 and 104 are made of a durable material able to withstand heavy loads, including the weight of a vehicle. Accordingly, in one or more embodiments, support legs 102 and 104 are made from a durable metal, such as steel, although alternative materials and/or elements may also be used. Further, it is noted that any suitable manufacturing process may be used for forming support legs 102 and 104.

Further, the individual components of lever adapter device 101 (including jack attachment piece 116, position locking pins 118 and 119, stabilizing feet 106 and 108, and support legs 102 and 104) may also be made of a durable metal, such as steel. Those of ordinary skill in the art know that alternative materials may be used or used in combination with a metal without limitation thereto. Despite being made of durable, sturdy materials, lever adapter device 101 may also be lightweight and not overly heavy, such that a single individual may easily carry and lift lever adapter device 101 from place to place. Embodiments of lever adapter device 101 may range anywhere from ten (10) to twenty-five (25) pounds in weight, without limitation to this range, as lever adapter device 101 may weigh more or less than the weights provided in this weigh range in alternative combinations and configurations. In some embodiments, lever adapter device 101 may be comprised of aluminum and/or steel, but in alternative embodiments, lever adapter device 101 may be made primarily from carbon fiber, which would make lever adapter device 101 a light weight tool and device. Notably, the lever adapter device 101 is not an extremely heavy object and is well-suited to be an easily transportable tool.

As shown in FIG. 1B, support legs 102 and 104 have a top surface, such as top surface 136 and a bottom surface, such as bottom surface 135. In one or more embodiments, bottom surface 135 may be straight and flat. Alternatively, or additionally, bottom surface 135 of each one of support legs 102 and 104 may also be angled or curved.

Support legs 102 and 104 may each have an upwardly tapering portion, such as upwardly tapering portion 132. Further, support legs 102 and 104 may each have a downwardly tapering portion, such as downwardly tapering portion 134. In one or more embodiments, a body of support leg 102 is designed to be substantially the same or identical as the body of support leg 104. Thus, both support legs 102 and 104 may have a curved shape as shown in FIGS. 1A and 1B (although in alternative embodiments, support legs 102 and 104 may be designed to be straight and flat as further described later in the present description).

Figure 3:
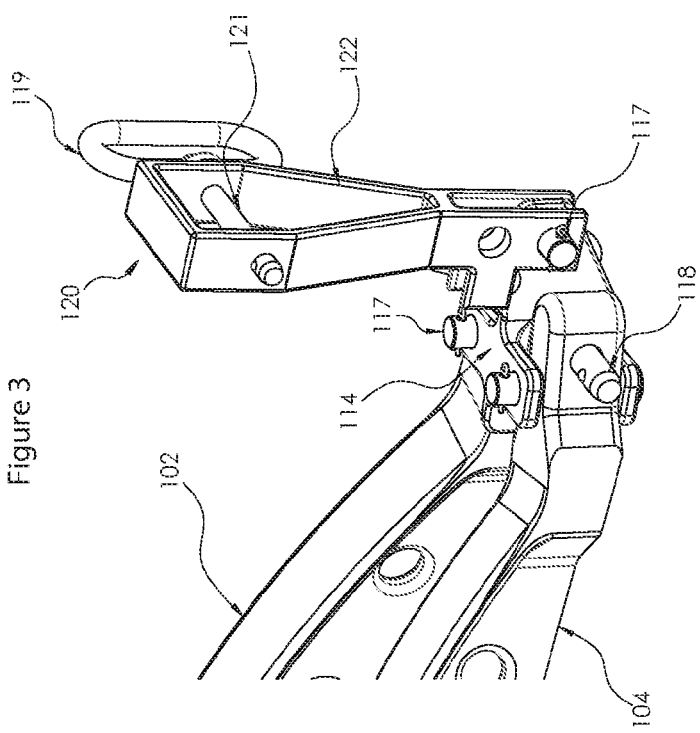
FIG. 3 illustrates an embodiment of a jack attachment piece and hinged support legs of a lever adapter device.

As shown in FIGS. 1A and 1B, support legs 102 and 104 may have the same general appearance. However, it is noted that support legs 102 and 104 may be any size or shape as desired. In one or more implementations, support legs 102 and 104 may taper upwardly to a flat support surface, such as flat support surface 130. At a terminal end of flat support surface 130, the downwardly tapering portions 134 of support legs 102 and 104 may begin. Flat support surface 130 may have a uniform height or may increase or decrease in other configurations. Notably, support legs 102 and 104 are designed to curve upwardly and then to curve downwardly. At an end of support legs 102 and 104, proximate to where hinge 114 as shown in FIG. 3 is coupled to each support leg 102 and 104, there may be one or more holes that extend through an end of support legs 102 and 104, such that a position locking pin, such as position locking pin 118, may be extended through the one or more holes, which is further elaborated on below.

As further described below, (and as shown in FIG. 5 and FIGS. 6A-6C), lever adapter device 101 may be particularly well-suited for lifting vehicles. It is therefore necessary that support legs 102 and 104 are configured to be fit underneath a vehicle, such as by being slid underneath a vehicle. In one or more embodiments, support legs 102 and 104 may slide underneath an underside of a vehicle and have adequate clearance to do so without being obstructed by a surface of the vehicle.

As used herein, the term "clearance" may be used to indicate a distance from the ground surface to a bottom surface of a vehicle or other object being lifted by lever adapter device 101. For many small to medium sized vehicles, there may be at least 5 inches to 7 inches worth of clearance or distance from a bottom surface of the vehicle to ground level. Accordingly, in one embodiment, support legs 102 and 104 may be designed so as to have a maximum height (ex. maximum height 110 shown in FIG. 1A) suitable to fit a clearance of most small to medium sized vehicles. In other embodiments, support legs 102 and 104 may be designed to have a height that can accommodate vehicles or other objects with higher clearances, such as clearances over 6 inches. Notably, a profile and maximum height 110 of lever adapter device 101 is well suited for being easily slide beneath most vehicles or other objects that need to be raised or lifted. In one exemplary embodiment, a maximum height of support legs 102 and 104 is less than 5½ inches.

FIG. 1A shows length 112 of support leg 102. In one or more embodiments, length 112 may range from 2 feet to 6 inches long. Those of ordinary skill in the art will appreciate lever adapter device 101, including support legs 102 and 104 may be designed to be as long as desired, and no limitation is provided herein with respect to length or any other dimensions.

Figure 8:
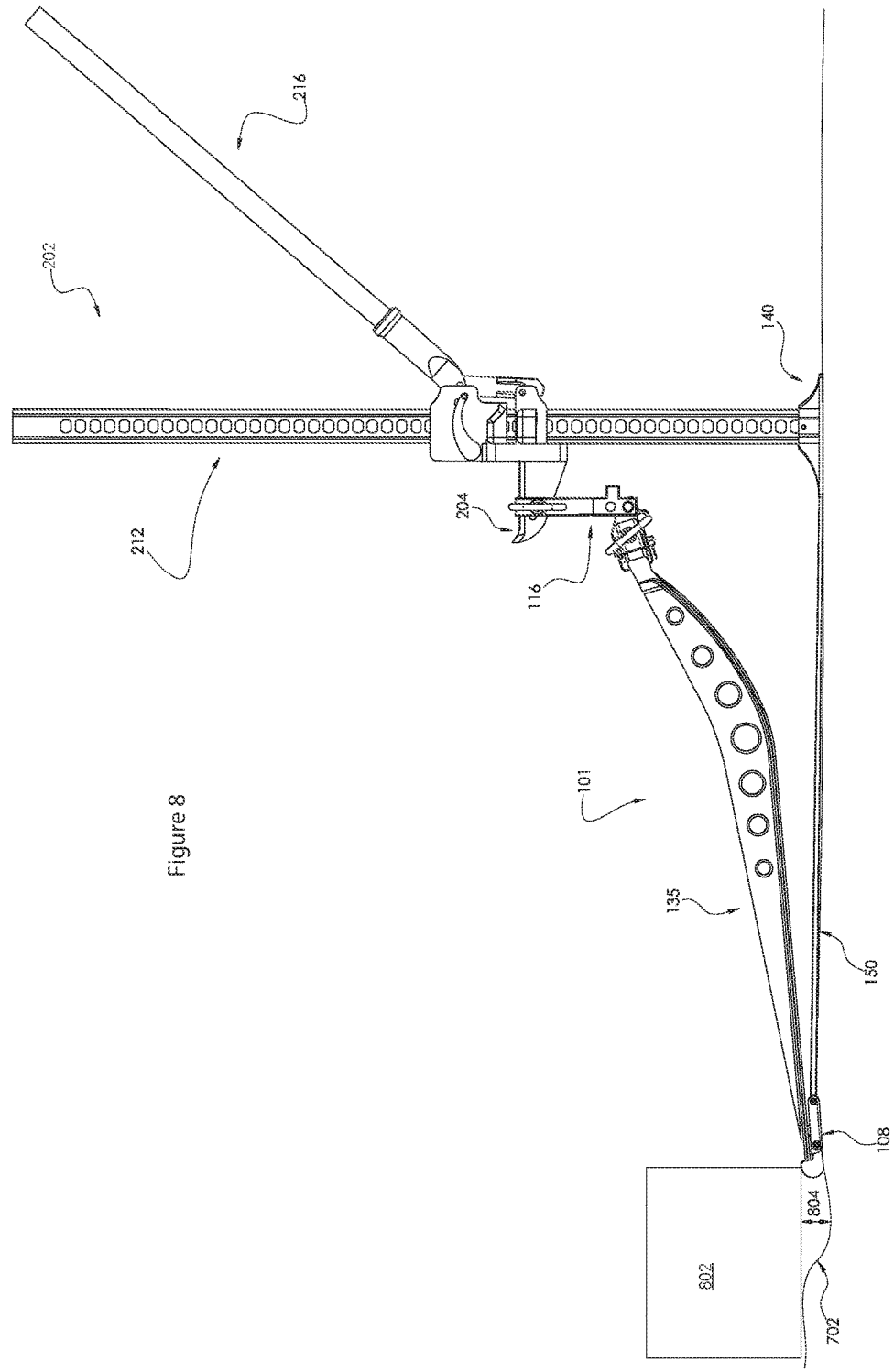
FIG. 8 illustrates an embodiment of a lever adapter device in an inverted position according to another method of using a lever adapter device.

As shown in FIGS. 1A and 1B, lever adapter device 101 is implemented to be used in a concave down position, such that the bottom surfaces 135 of support legs 102 and 104 make physical contact with a ground level or ground surface. Notwithstanding the above, FIG. 8 shows how lever adapter device 101 may also be used in an inverted position. Additional details for using lever adapter device 101 in an inverted position as shown in FIG. 8 are provided below.

In one or more embodiments, support legs 102 and 104 are essentially formed as a single solid beam structure. In some embodiments, support legs 102 and 104 may be integrally formed as a single whole piece. Alternatively, in other embodiments, support legs 102 and 104 may be formed as an assembly of separate structural pieces. In one or more embodiments, support legs 102 and 104 may be formed as a modified I-beam structure. In alternative embodiments, a body of support legs 102 and 104 may include double beams, triple beams, or any number of beams as needed. Accordingly, in one or more embodiments, support legs 102 and 104 may each include an upper beam coupled to a lower beam that makes up the body of each one of support legs 102 and 104. Having the upper beam coupled to the lower beam for each one of support legs 102 and 104, according to alternative embodiments (not shown in FIGS. 1A and 1B), may add strength and additional structural stability to lever adapter device 101.

Further, it is noted, that the holes shown in FIGS. 1A and 1B that extend through a thickness of support legs 1A and 1B may be omitted in alternative designs or vary in number and size and spacing. In one or more embodiments, the holes shown in FIGS. 1A and 1B disposed throughout a body of lever adapter device 101 may function to reduce the weight of lever adapter device 101 as well as to assist in maintaining the strength of the lever adapter device 101.

In one or more embodiments, lever adapter device 101 may further include stabilizing feet disposed at a distal end of each support leg. As shown in FIGS. 1A and 1B, stabilizing foot 108 is attached to an end of support leg 102 and stabilizing foot 106 is attached to an end of support leg 104. Stabilizing feet 108 and 106 assist by preventing slippage of support legs 102 and 104, respectively, and provide additional grip for the lever adapter device 101 of a ground surface. It is foreseeable that lever adapter device 101 may be used on a variety of terrains, including on terrains that may contribute to easy slippage of the lever adapter device 101 during actual use. Accordingly, lever adapter device 101 may accommodate a variety of ground surfaces and terrains, including, but not limited to, muddy surfaces, rocky surfaces, snow, sand, pavement and/or dirt roads.

Stabilizing feet 106 and 108 are shown as each having a rectangular shaped frame, such as frame 107, although alternative shapes and configurations may certainly be used. A frame 107 for each foot 106 and 108 may include small tubular bars 109 disposed on opposite ends of foot frame 107. Notably, stabilizing feet 106 and 108 are securely fastened to a distal end of support legs 104 and 102, respectively. Stabilizing feet 106 and 108 may be coupled to a distal end of support legs 102 and 104 using any affixation methods known in the art, including using any type of fasteners, adhesives or via welding or soldering, without limitation to these methods.

Stabilizing feet 106 and 108 provide additional other advantages in addition to providing grip to a ground surface and stabilization. For example, a strap, such as strap 150 shown in FIG. 1C, may be used in one or more applications to further stabilize lever adapter device 101 and may be attachable to each foot 106 and 108, as further described below with respect to FIG. 1C.

Lever adapter device 101 may further include a jack attachment piece, such as jack attachment piece 116, one or more hinges, such as hinge 114, which is shown in FIG. 3, and position locking pins, such as position locking pins 118 and 119. FIG. 3 shows a close-up view of jack attachment piece 116, hinge 114, and position locking pins 118 and 119 for lever adapter device 101. As shown in FIG. 3, hinge 114 may be coupled to a proximate end of each support leg 102 and 104 using one or more fasteners, such as fasteners 117. Fasteners 117 may be any type of fasteners known in the art, including, but not limited to, any type of screw and/or nut and bolt combination. While a single hinge 114 is shown in FIGS. 1A and 1B, those skilled in the art may appreciate that additional hinges may also be used in alternative embodiments. Further, it is noted that any suitable hinge may be used to couple support legs 102 and 104. In one embodiment, hinge 114 may be a simple post type hinge for each axis pivot (i.e. a pivot point for each support leg 102 and 104 to hinge 114). In other embodiments, lever adapter device 101 may include a complex multiple axis complex hinge. As shown in FIGS. 1A and 1B, hinge 114 may provide the ability for support legs 102 and 104 to be spread towards or away from each other over a single axis, but in alternative configurations, support legs 102 and 104 may be moveable over multiple axes, and thus configured to pivot using a hinge, such as hinge 114, that functions to pivot support legs 102 and 104 over multiple axes.

Figure 4:
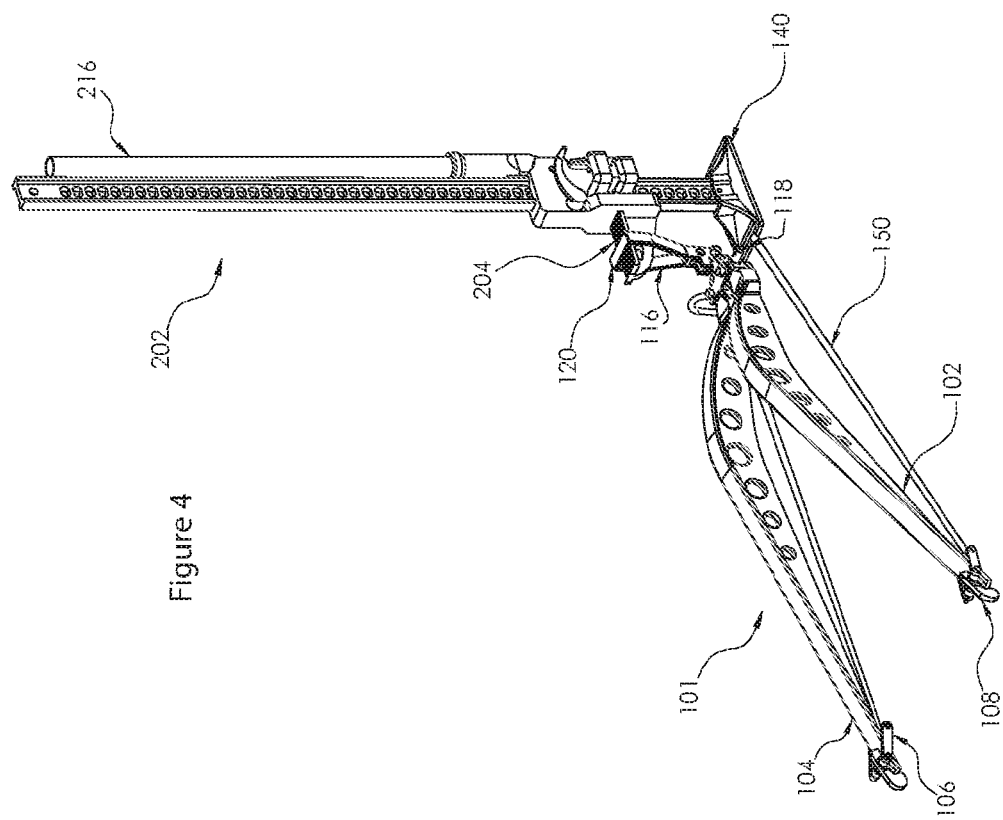
FIG. 4 illustrates an embodiment of a lever adapter device connected to a HI-LIFT jack.

With respect to jack attachment piece 116, jack attachment piece 116 is a part of lever adapter device 101 that has a number of functions. In one example, jack attachment piece 116 is used for connecting lever adapter device 101 to HI-LIFT jack 202 (as shown in FIG. 4). Jack attachment piece 116 may have a frame, such as jack attachment piece frame 122, as shown in FIG. 3. Further, jack attachment piece 116 may include an opening or aperture, such as opening 121 that is defined by its frame 122, which includes top bar 120. Top bar 120 may also function as a handle that the operator of lever adapter device 101 may grasp to carry lever adapter device 101 and also to couple lever adapter device 101 to a jack or other device (e.g. HI-LIFT jack 202 shown in FIG. 2). Even though jack attachment piece 116 is shown in FIGS. 1A, 1B, and 3 as being triangular shaped, any suitable shape may be used. For example, in alternative embodiments, jack attachment piece 116 may be rectangularly shaped.

It is a feature of jack attachment piece 116 that it may be rotatable from a horizontal to an upright vertical position. Further, jack attachment piece 116 may be rotatable to any angle other than an upright vertical position. FIGS. 1A and 1B show jack attachment piece 116 as being positioned in an upright vertical position. FIG. 7 shows jack attachment piece 116 as being positioned in a horizontal flat position. Thus, jack attachment piece 116 is rotatable in orientation as determined by its operator and dependent on its use.

In one or more embodiments, jack attachment piece 116 may be rotated to an upright vertical position when a user of lever adapter device 101 is coupling jack attachment piece 116 to a HI-LIFT jack, such as HI-LIFT jack 202. Jack attachment piece 116 may also be rotated to an upright vertical position of a user wants to couple the jack attachment piece 116 to another type of jack or equipment. Conversely, when a user wants to stow away lever adapter device 101, jack attachment piece 116 may be rotatable to a horizontal flat position, as shown in FIG. 7, for easy storage Jack attachment piece 116 may include a number of position locking pins, such as position locking pins 118 and 119. It is noted that a greater or lesser number of position locking pins other than those illustrated in the Figures may be used as needed. Position locking pins 118 and 119 may each have a number of uses. In one embodiment, position locking pin 118 is insertable through a slot (not shown) that extends through a lower portion of jack attachment piece frame 122 and through each support leg 102 and 104. A user may selectively remove and insert position locking pin 118, as desired. By inserting position locking pin 118, in one embodiment, jack attachment piece 116 may be locked in an upright position, and each support leg 102 and 104 may also be locked in place. Position locking pins 118 and 119 are removeable and may be selectively inserted or removed from their designated slots.

To lock jack attachment piece 116 in place, as well as each support leg 102 and 104, in one non-limiting embodiment, a user may remove position locking pin 118 from its designated slot. Next, a user may spread support legs 102 and 104 to the desired position, thus extending each leg 102 and 104 apart or retracting support legs 102 and 104 closer together as desired. Subsequently, a user may grasp top bar 120 (i.e. the handle) of frame 122 of jack attachment piece 116 and rotate jack attachment piece 116 from a horizontal, flat position to a vertical, upright position. Next, a user may re-insert position locking pin 118 through its designated slots or openings in jack attachment piece 116 and support legs 102 and 104. Upon insertion of position locking pin 118 through the designated slot in jack attachment piece 116 as well as support legs 102 and 104, these elements may be locked in place. With respect to position locking pin 119, position locking pin 119, as further described below, may be useable when coupling frame 122 of jack attachment piece 116 to a HI-LIFT jack, such as HI-LIFT jack 202 shown in FIG. 2, or another type of jack or device.

As noted above, support legs 102 and 104 may be moveable, and may be moved within a particular range of movement so as to be spread apart from one another (e.g. as shown in FIGS. 1A and 1B). The distance between support legs 102 and 104 may be determined by an operator of lever adapter device 102. Because support legs 102 and 104 are connectively joined (e.g. via hinge 114), support legs 102 and 104 are able to move to an open or closed position.

It is noted that support legs 102 and 104 may be opened as wide as desired by an operator of lever adapter device 101. Alternatively, support legs 102 and 104 may be closed so as to be brought in alignment with each other (e.g. as shown in FIG. 7). Alternatively, or additionally, each support leg 102 and 104 may be independently moveable with respect to the other. In one embodiment, a position locking pin, such as position locking pins 118 and 119, may be used to pin a particular support leg in place once that support leg was positioned at a desired angle. Thus, it is possible to arrange each support leg separately from the other and at an angle that is different from the other, even while both support legs are connectively joined using one or more hinges (e.g. hinge 114).

It is noted that jack detachment piece 116 may be detachably coupled to support legs 102 and 104 via hinge 114. To remove or detach jack attachment piece 116, an operator may unfasten one or more fasteners 117 (e.g. by unscrewing or removing the nuts and/or bolts holding jack attachment piece 116 in place). In this way, it may be advantageously easy and convenient for an operator to detach jack attachment piece 116 as needed. There may be different reasons why an operator may choose to detach jack attachment piece 116. For example, FIG. 9 shows a lever adapter device 101 attached to a scissor jack lift, such as scissor jack lift 902. In one or more embodiments, the jack attachment piece 116 is removed before connecting the remainder of the lever adapter device 101 to a scissor jack lift, such as scissor jack lift 902, although there may also be embodiments where jack attachment piece 116 remains in place when lever adapter device 101 is coupled to a scissor jack lift, such as scissor jack lift 902.

Figure 1C:
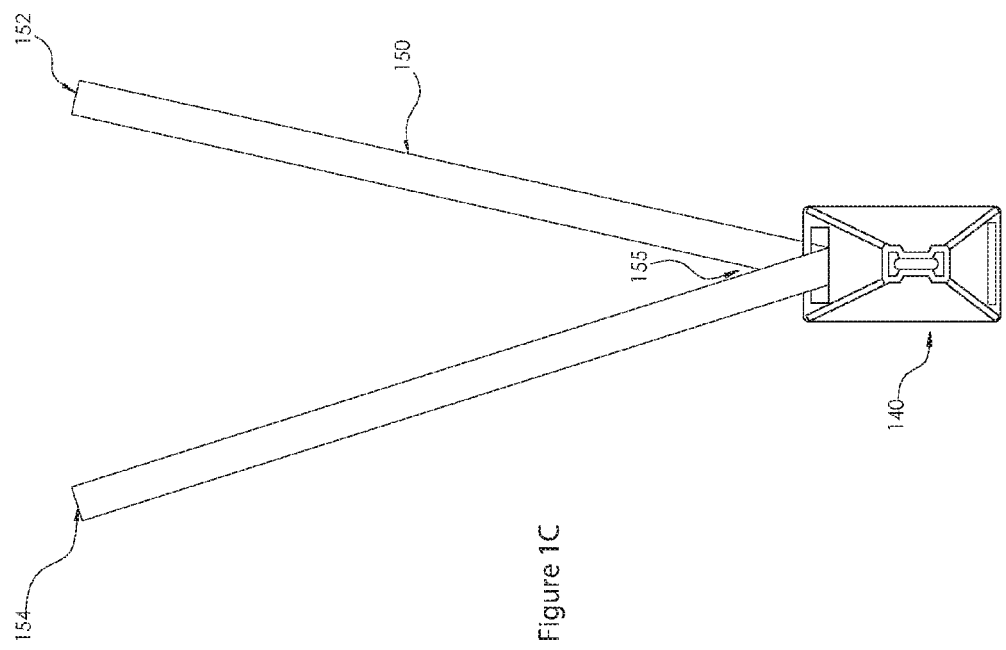
FIG. 1C illustrates a strap and base plate that may be used with an embodiment of a lever adapter device.

Turning to FIG. 1C, FIG. 1C illustrates additional components or accessories that may be beneficial in providing additional stability when used in conjunction with lever adapter device 101. FIG. 1C illustrates strap 150 and base plate 140, which are each their own separate pieces. FIG. 1D also illustrates base plate 140 as shown in FIG. 1C.

Figure 2:
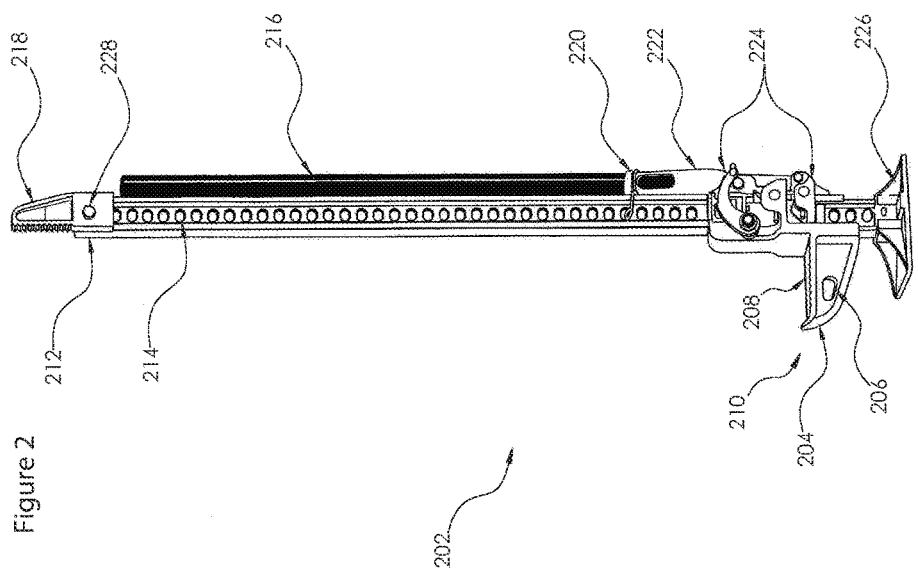
FIG. 2 illustrates a side view of a HI-LIFT jack known in the art.

In one embodiment, base plate 140 is a structural base plate having a frame, such as base plate frame 162. Base plate 140 (as shown in FIGS. 1C and 1D) has a rectangular shaped design, but may be designed to have any shape known in the art in alternative embodiments. Base plate 140 may include a first opening 143 and a second opening 144 defined by the base plate frame 162. Further, base plate 140 may include a center portion 149, which in turn includes its own smaller central opening, shown as opening 164. Central opening 164 may be sized to fit a beam or bar, such as the bar 212 of a HI-LIFT jack (as shown in FIG. 2). Base plate 140 may further include a top bar 145 and a bottom bar 147 located on opposite sides of the base plate frame 162. However, it is noted that base plate 140 may be oriented during use with either its top bar 145 or its bottom bar 147 facing lever adapter device 101.

As shown in FIG. 1C, strap 150 may be any type of strap known in the art. Strap 150 may essentially be an elongated ribbon that is made of durable material. Strap 150 includes a first end 152 and a second end 154. Strap 150 may be made of any suitable material and/or fabric, including, but not limited to nylon. In alternative configurations strap 150 may comprise a strong rope, chain, or other type of tying member may be used.

Strap 150 may be used to provide additional stabilization for support legs 102 and 104 of lever adapter device 101, and help prevent support legs 102 and 104 from moving during use. To use strap 150, in one or more embodiments, strap 150 may be coupled to both stabilizing feet (e.g. feet 106 and 108) of support legs 102 and 104 at one end, and then looped (e.g. as shown at 155 in FIG. 1C) over a frame of a base plate, such as base plate 140. Thus, a first end 152 of strap 150 may be coupled to a frame of a foot of lever adapter device 101 (e.g. foot frame 107) by tying end 152 of strap 150 around or over foot frame 107 of foot 106. Once the first end 152 of strap 150 is tied or otherwise securely coupled to foot 106 of support leg 104, strap 150 may be stretched towards a base plate, such as base plate 140, and looped over a top bar, such as top bar 145. Thus, strap 150 is coupled to base plate 140 by looping substantially a middle portion of strap 150 over a portion of base plate 140. Afterwards, the second end 154 of strap 150 may be tied or otherwise coupled to foot 108 of support leg 102. Strap 150 may be of a length suitable to reach the ends of both feet of lever adapter device 101 and also to wrap around a bar, such as bar 145 of base plate 140. In one or more embodiments, strap 150 may be at least six (6) feet in length or greater, but is not limited thereto.

Strap 150 may thus be looped over top bar 145 (or alternatively bottom bar 147) of base plate 140 and pass through the first opening 143 (or second opening 144). When attached, strap 150 takes on a general "V" shape. Specifically, upon coupling strap 150 to stabilizing feet 108 and 106 and to base plate 140 (in accordance with the steps described above), strap 150 will take on the appearance of a "V" or triangle shape (as shown in FIG. 4). Having strap 150 coupled to both feet 108 and 106, as well as base plate 140 assists in keeping support legs 102 and 104 in the particular positions as desired by the operator of lever adapter device 101. Further, providing strap 150 coupled to base plate 140 and to stabilizing feet 106 and 108 prevents support legs 102 and 104 from "kicking" out from under the vehicle, for example, when coupled to a HI-LIFT jack, such as HI-LIFT jack 202 shown in FIG. 2.

Turning to FIG. 2, FIG. 2 shows a well-known embodiment of a HI-LIFT jack. The HI-LIFT company owns a trademark (trademark registration number 804,605, serial no. 72192151) for a series of jacks known in the industry as HI-LIFT jacks. Accordingly, a HI-LIFT jack is a special type of jack that is known for its ruggedness and versatility of use. Furthermore, HI-LIFT jacks may be particularly useful for firefighters and other first responders in emergency rescue operations, because HI-LIFT jacks are particularly useful in emergency rescue situations that call for extrication, vehicle recovery, forcible entry, stabilization, and shoring.

As shown in FIG. 2, HI-LIFT jack 202 may include a bar, shown as bar 212 having a number of holes 214 disposed along the length of bar 212. HI-LIFT jack 202 may further include a handle, such as handle 216, which may be engaged by a user of HI-LIFT jack 202 to selectively raise or lower a large runner, such as runner 204 also located on HI-LIFT jack 202.

HI-LIFT jack 202 may further include base plate 226, which may be provided by the manufacturer of HI-LIFT 202. It is noted, that HI-LIFT jacks, such as HI-LIFT jack 202, are often utilized without the manufacturer base plate 226. Accordingly, the present description includes embodiments whereby an operator of lever adapter device 101 may couple base plate 140 (as shown in FIG. 1C) to a bottom of bar 212 to provide further stabilization and to provide a base plate that prevents a HI-LIFT jack from falling over. Accordingly, central opening 164 of center portion 149 of base plate 140 (as shown in FIG. 1C) may be configured to accommodate standard sized bars of HI-LIFT jacks, such as bar 212 of HI-LIFT jack 202.

As shown in FIG. 2, HI-LIFT jack 202 may further include a handle clip 220 for clipping handle 216 against bar 212 of HI-LIFT jack 202. An operator may engage handle 216 of HI-LIFT jack 202 by grasping and pulling back on handle 216 directly or grasping handle socket 222. HI-LIFT jack 202 further includes running gear 224 which is an assembly of components included on a lower half of HI-LIFT jack 202 that enable the runner 204 to be raised or lowered as needed.

Runner 204, as shown in FIG. 2, is in its lowest possible position. In such a low position, runner 204 may be placed beneath a particular surface of a vehicle or other object in order to lift the vehicle or other object. Runner 204 has a top surface 208 and a protruding end 210 disposed at an edge of top surface 208. Typically, when a HI-LIFT jack, such as HI-LIFT jack 202, is used to raise a vehicle off of the ground, an operator will position HI-LIFT jack 202 so that runner 204 is located beneath a stable portion of the underside of a vehicle (e.g. a side panel or beneath the rocker panel of a vehicle). Thus, the top surface 208 of runner 204 makes contact with a solid portion of the underside of the vehicle. By grasping the handle 216 of HI-LIFT jack 202 and engaging the handle 216 to raise runner 204, a vehicle may eventually be raised off of the ground. Runner 204 also includes a slot 206 that extends through a thickness of the body of runner 204. As further described below, slot 206 is used during one or more steps for coupling lever adapter device 101 to HI-LIFT jack 202.

While HI-LIFT jacks, such as HI-LIFT jack 202 are known for their versatility and ruggedness, especially in emergency rescue operations, there have been numerous occasions under critical conditions where HI-LIFT jacks, such as jack 202, have fallen over and dropped a vehicle or other heavy object while being lifted. Further, when emergency rescue operators are attempting to lift vehicle using HI-LIFT jacks such as HI-LIFT jack 202, the emergency rescue operators are only able to raise the vehicle about 13-15 inches. Advantageously, when lever adapter device 101 is coupled to a HI-LIFT jack, such as HI-LIFT jack 202, it may be possible to raise a vehicle to approximately 24 inches. This additional height makes a significant difference for firefighters and first responders seeking additional room in a cramped area beneath a vehicle (whether overturned or not) to rescue anyone who may be trapped.

Referring to FIG. 4, FIG. 4 shows an illustration of an embodiment of lever adapter device 101 coupled to a HI-LIFT jack, such as HI-LIFT jack 202. To couple lever adapter device 101 to HI-LIFT jack 202, an operator may bring lever adapter device 101 close to HI-LIFT jack 202. Next, an operator may move each support leg 102 and 104 to a desired position. For example, in one embodiment, an operator may spread support legs 102 and 104 apart, and then insert position locking pin 118 in place so as to keep the support legs 102 and 104 spread apart. The operator may selectively insert position locking pin 118 in a designated slot that may run through frame 122 of jack attachment piece 116 and also through an end of each support leg 102 and 104. By selectively inserting position locking pin 118 in its designated slot, an operator may lock support legs 102 and 104 in place in a particular position. Alternatively, or additionally, while not shown in the present description, additional position locking pins may be used that fit into additional slots located on each support leg 102 and 104. Therefore, a pin may be used to pin each support leg 102 and 104 in place, separate from the other. Using such a technique may allow for the support legs 102 and 104 to be spread at variable angles so as to best suit the needs of the operator.

Upon positioning the support legs 102 and 104 as desired, the operator may rotate the jack attachment piece 116 to an upright vertical position (as shown in FIGS. 1A and 1B). Position locking pin 119, as shown in the upper portion of the frame 122 of jack attachment piece 116 may be used to couple jack attachment piece 116 to the runner 204 of HI-LIFT jack 202. Specifically, in one or more embodiments, position locking pin 119 may be inserted through slot 206 of runner 204 and also through a designated slot that extends through the upper portion of frame 122 of jack attachment piece 116 (as shown in FIG. 4). Once position locking pin 119 is in place, the jack attachment piece 116 of lever adapter device 101 is securely attached to HI-LIFT jack 202. Further, lever adapter device 101 may be moved whenever HI-LIFT jack 202 is carried or moved to a site.

In this manner, an operator may simply and easily maneuver lever adapter device 101 and HI-LIFT jack 202 while they are coupled together. The operator can easily lift HI-LIFT jack 202 by holding onto a top surface 218 of HI-LIFT jack 202 (or any other portion of HI-LIFT jack 202), and in doing so, carry both HI-LIFT jack 202 and lever adapter device 101 towards a vehicle or other object that needs to be raised. In some embodiments, top surface 218 of HI-LIFT jack 202 may be detachably coupled to bar 214, because top surface 218 is fastened to bar 214 using one or more fasteners, such as fastener 228. As previously described, lever adapter device 101 does not add a significant amount of weight, such that a single operator is able to easily carry and lift lever adapter device 101. Further, most HI-LIFT jacks, such as HI-LIFT jack 202, weigh under three to five pounds, and are thus not overly heavy to carry. The combination of a HI-LIFT jack 202 when coupled to lever adapter device 101 may be easily carried and lifted by one individual (although other people may assist as required).

FIG. 4 further illustrates base plate 140 and strap 150 in use with both lever adapter device 101 and HI-LIFT jack 202. As shown in FIG. 4, strap 150 has been looped over a bar (e.g. bar 145 or 147) of a frame 162 of base plate 140 and then each end (e.g. ends 152 and 154) of strap 150 is securely tied or otherwise coupled to a frame of stabilizing feet 106 and 108. Further, base plate 140 may be securely coupled to a bottom surface of steel bar 212 of HI-LIFT jack 202. It is an objective of this embodiment that base plate 140 provides a stable base plate for HI-LIFT jack 202 to rest upon. FIG. 4 further illustrates the "V" shape or triangular shape that occurs when strap 150 is coupled to stabilizing feet 106 and 108 at each end of strap 150, and also to base plate 140. In view of the above, there are a number of beneficial features included with lever adapter device 101. For example, lever adapter device 101 provides a larger footprint for HI-LIFT jack 202, and also provides a significant amount of stability when using a jack, such as HI-LIFT jack 202 to lift a vehicle or other object.

Figure 5:
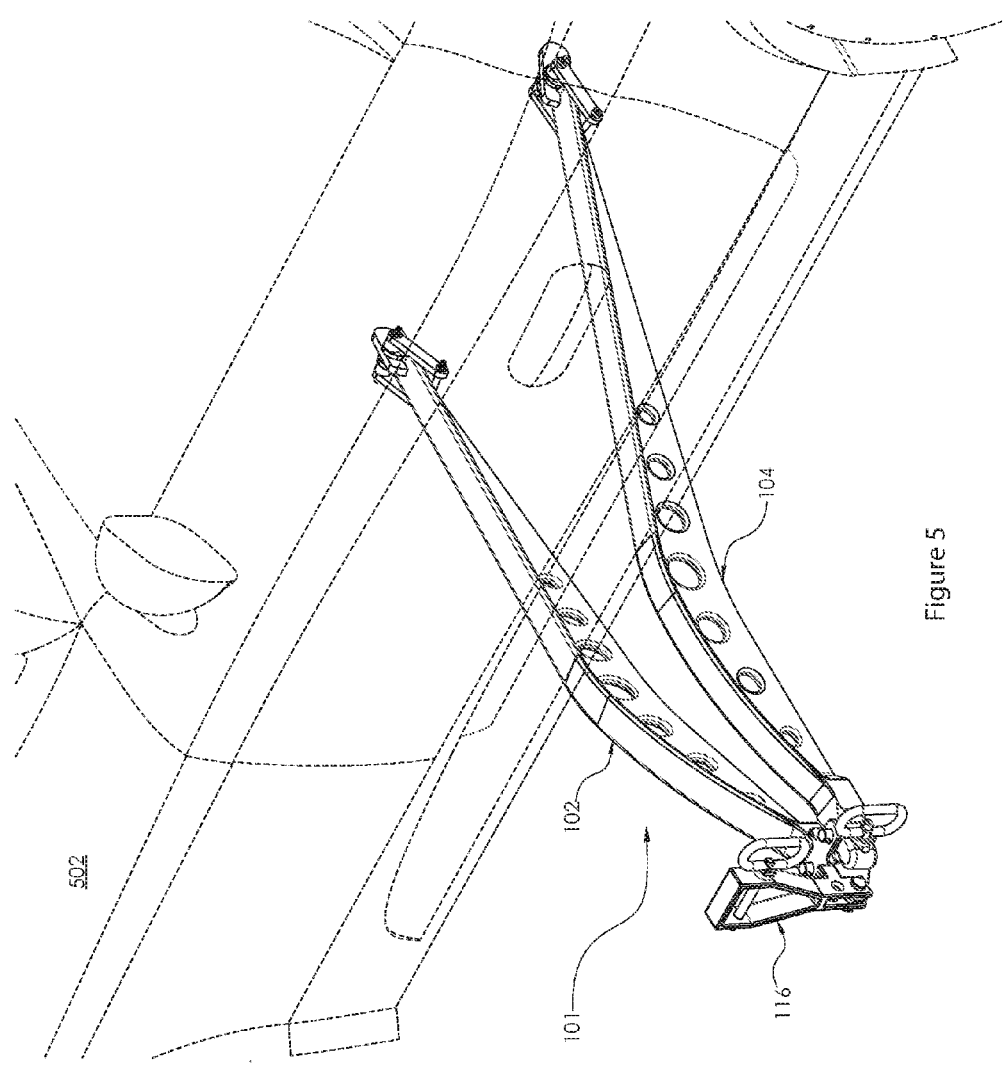
FIG. 5 illustrates an example of a deployed position of a lever adapter device under a vehicle.

Turning to FIG. 5, FIG. 5 shows an illustration of lever adapter device 101 in a position ready for use and for coupling with HI-LIFT jack 202 as located beneath vehicle 502. Vehicle 502 is shown in FIG. 5 as an exemplary vehicle. As previously discussed, vehicle may have a clearance of at least five to seven inches, without limitation thereto. Accordingly, lever adapter device 101 may have a profile and maximum height (e.g. maximum height 110) that does not exceed the specific clearance of vehicle 502. While not shown in FIG. 5, a user may choose to first securely couple HI-LIFT jack 202 to lever adapter device 101 and then slide support legs 102 and 104 beneath vehicle 502.

Support legs 102 and 104, as shown in FIG. 5, may have been spread apart and locked in place in their deployed positions at the selected angle desired by the user prior to lever adapter device 101 beneath vehicle 502. Stabilizing feet 106 and 108 are also positioned so as to provide further grip on a ground surface on which vehicle 502 is located upon. FIG. 5 further illustrates that jack attachment piece 116 is raised in an upright, vertical position and is visible to an operator of lever adapter device 101. When positioned for use, jack attachment piece 116 and a portion of support legs 102 and 104 is not located beneath vehicle 502. Accordingly, in one or more embodiments, about five to seven inches, without limitation thereto, of support legs 102 and 104 may be showing between the jack attachment piece 116 and a rocker panel or side panel of vehicle 502.

Referring to FIGS. 6A-6C, FIGS. 6A-6C illustrate one or more stages of deployment of lever adapter device 101 when coupled to HI-LIFT jack 202. FIG. 6A illustrates a deployed lever adapter device at an initial point in lifting a vehicle, such as vehicle 502. FIG. 6B illustrates a deployed lever adapter device at a middle point in lifting a vehicle. FIG. 6C illustrates a deployed lever adapter device at an end point in lifting a vehicle.

In FIG. 6A, an operator may initially position lever adapter device 101 beneath vehicle 502. Clearance 602 as depicted in FIG. 6A highlights how much space may be available beneath vehicle 502. A firefighter or other first responder thus has an understandable need to raise vehicle 502 in order to rescue a trapped individual located beneath vehicle 502. As noted above, there may be other scenarios or circumstances whereby lever adapter device 101 may be used other than in emergency rescue operations. However, it is of particular importance and a special characteristic of lever adapter device 101 that it may be particularly beneficial for firefighters and other first responders.

In FIG. 6A, vehicle 502 is at its lowest level (i.e. not in a lifted state) and flush with a ground surface. FIG. 6A shows that the bottom surfaces of support legs 102 and 104 (e.g. bottom surface 125) may be level with the ground. A top surface of support legs 102 and 104 (e.g. top surface 136) may be mostly clear of and not making physical contact with an underside portion of vehicle 502. However, it is also possible and probable that a highest level of a top surface of support legs 102 and 104 (e.g. flat support plane 130) may be operable engaged and in physical contact with a surface on the underside of vehicle 502.

As shown in FIG. 6A, HI-LIFT jack 202 has already been coupled to jack attachment piece 116 of lever adapter device 101 (e.g. in accordance with one or more steps as previously described using position locking pin 119 inserted through slot 206 of runner 204). FIG. 6A shows that handle 216 is still pressed against bar 212 of HI-LIFT jack 202 and has not yet been engaged to raise vehicle 502.

When positioning HI-LIFT jack 202 against an underside of vehicle 502, an operator may carefully select a portion of vehicle 502 where runner 205 may be braced under. Thus, a top surface 208 of runner 204 of HI-LIFT jack 202 makes physical contact with a portion of vehicle 502 prior to beginning the lifting process. Depending on the specific scenario, lever adapter device 101 and HI-LIFT jack 202 may be located at a variety of angles or positions with respect to vehicle 502. An operator may selectively determine the location placement of lever adapter device 101. It may be preferred, in one or more embodiments, that lever adapter device 101 may be optimally positioned perpendicular to a balance point of a vehicle's long axis, such as somewhere beneath a vehicle's front seats. However, it is noted that lever adapter device 101 may be positioned (either parallel to, perpendicular, or in another manner) anywhere under vehicle 502 as needed per the situation, including, but not limited to, beneath the underside of the hood, trunk, doors or side panels of a vehicle.

FIG. 6B shows that handle 216 has been grasped and pulled back to prepare for engaging the HI-LIFT jack 202 to raise vehicle 502. An operator may thus engage handle 216 of HI-LIFT jack 202 to raise vehicle 502 in accordance with the methods known to those skilled in the art for operating a HI-LIFT jack 202. It is a benefit of lever adapter device 101 that lever adapter device 101 may be used with HI-LIFT jack 202 without altering the existing techniques for using HI-LIFT jack 202, which many firefighters, first responders, or other individuals may be highly trained and already familiar with using.

FIG. 6B shows that operator is in the middle of a process of raising vehicle 502. Accordingly, in FIG. 6B, the bottom surfaces of support legs 102 and 104 (e.g. bottom surface 135) are not level with the grounds surface as was the case in FIG. 6A. Instead, support legs 102 and 104 have been raised and lifted along with vehicle 502. Further, the top surface of support legs 102 and 104, once the lifting process has commenced, are also in contact with one or more surfaces on an underside of vehicle 502. The physical contact of support legs 102 and 104 with the underside of vehicle 502 provides additional stability and a larger footprint that would not be present if an operator were to simply use HI-LIFT jack 202 to raise vehicle 502 off of the ground.

As shown in FIG. 6B, stabilizing feet 106 and 108 remain flat against a ground surface and act as slip-resistant, gripping members that firmly make contact with a ground surface and provide additional stability during the lifting process. While not shown in FIG. 6B, it is noted that an operator may also use base plate 140 and strap 150, in accordance with one or more methods previously described herein, to further ensure that support legs 102 and 104 remain firmly fixed in place, and that HI-LIFT jack 202 does not fall over or fail.

FIG. 6C shows a final position of HI-LIFT jack 202 and lever adapter device 101 in a fully deployed position. In FIG. 6C, vehicle 502 has been raised to a desired height by the operator. At this desired height, in one or more scenarios, there is sufficient clearance 602 for the operator to access an underside of vehicle 502. Thus, support legs 102 and 104, and lever adapter device 101 have been fully raised off of ground at an angle, but stabilizing feet 106 and 108 remain in firm contact with a ground surface.

At this point, an operator may engage in a number of actions. An operator may selectively position a number of additional supports (not shown) at various points underneath the lifted vehicle 502. Such supports may include, without limitation thereto, vehicle jack stands or other support structures that may be formed of any type of material, including wood, concrete, or metal. Further, such supports and/or stands may come in a variety of shapes, heights, and overall dimensions. Firefighters and other first responders have a readily available supply of struts, blocks, and supports that they use to position against the wheels or underneath various portions of vehicles. As known to those skilled in the art, there are many types of supports that may be transported to a site for positioning beneath vehicle, and the operator may select the optimal type of supports and/or stands that he or she desires to use for the particular circumstance where vehicle 502 (or other heavy object) is being lifted.

Upon positioning any number of supports beneath the raised vehicle 502, an operator may begin lowering vehicle 502, by engaging the handle 216 of HI-LIFT jack 202 to lower vehicle 502. Lever adapter device 101 will remain coupled to HI-LIFT jack 202 during the lowering (or lifting) process. Upon lowering the vehicle 502 to a desired level, including lowering the vehicle 502 onto any of the used supports and/or stands, an operator may stop engaging handle 216 of HI-LIFT jack 202. At this step, both the support legs 102 and 104 of lever adapter device 101 function as structural supports able to carry the load of the vehicle 502 (in combination possibly with other added supports located beneath vehicle 502).

Once an operator has determined that vehicle 502 is securely lowered onto supports and is stable, the operator may determine to either withdraw HI-LIFT jack 202 and attached lever adapter device 101 or may determine to disengage HI-LIFT jack 202 from lever adapter device, and leave the lever adapter device 101 underneath the vehicle 502 to act as a support on its own.

In the first scenario, an operator may withdraw HI-LIFT jack 202 and attached lever adapter device 101 by pulling backwards on HI-LIFT jack 202 while walking away from vehicle 502. Operator may thus effectively pull both HI-LIFT jack 202 and the lever adapter jack 101 out from under vehicle 502, due to the fact that HI-LIFT jack 202 is still securely coupled to lever adapter device 101 by virtue of the jack attachment piece 116 being coupled to the runner 204 of HI-LIFT jack 202. In this manner, operator may easily maneuver both HI-LIFT jack 202 and lever adapter device 101 away from the vehicle 502.

For the latter scenario (whereby the operator determines to disengage HI-LIFT jack 202 from lever adapter device 102 and to leave the lever adapter device 101 underneath vehicle 502 to act as a support on its own), an operator may engage in the following steps. It may be assumed that this procedure may require that base plate 140 (or base plate 226 of HI-LIFT jack 202) be utilized (and optionally strap 150) to stabilize lever adapter device 101 beneath the raised vehicle 502 without being connected to HI-LIFT jack 202. As an initial step, the operator of lever adapter device 101 disengages HI-LIFT jack 202 from base plate 140 or base plate 226. In one embodiment, an operator may simply lift HI-LIFT jack 202 up and away from base plate 140 or base plate 226 positioned beneath a lower surface of HI-LIFT jack 202. Alternatively, to disengage HI-LIFT jack 202 from base plate 140 or base plate 226, the operator may have to unfasten one or more fasteners that couple HI-LIFT jack 202 to base plate 140 or 226. Either way, in one or more embodiments, HI-LIFT jack 202 may be detachably coupled to base plate 140 or base plate 226, and an operator may engage in any technique needed to detach HI-LIFT jack 202 from these base plates. To further disengage HI-LIFT jack 202, the operator may de-couple HI-LIFT jack 202 from lever adapter device 101 by removing position locking pin 119, and thus pulling position locking pin 119 away from the designated slot that extends through a frame 122 of jack attachment piece 116 and through the appropriate slot 206 located on runner 204.

Once HI-LIFT jack 202 has been disengaged, the operator may utilize a separate rod or strut (not shown) and dispose the separate rod or strut into the center slot 164 of base plate 140 (or base plate 226). Such rod or strut may include a number of slots at its upper surface and may be coupled to jack attachment piece 116 by inserting position locking pin 119 in these slots. Further, strap 150 may also be kept in place if strap 150 had been initially coupled to the stabilizing feet 106 and 108 located on a distal end of support legs 102 and 104. Accordingly, lever adapter device 101 may remain located beneath an underside of vehicle 502 and act as a support on its own while in the raised position (as shown in FIG. 6C), even if lever adapter device 101 is not coupled to HI-LIFT jack 202. HI-LIFT jack 202 may then be removed and attached to another lever adapter device to lift another vehicle or heavy object.

As shown by the steps described above, it is an advantage of the embodiments of lever adapter device 101 as described in the present description that the operator has a number of options when using lever adapter device 101 with HI-LIFT jack 202 to suit the operator's particular needs and current operating scenario.

In addition to the above, once the operator has had sufficient time to access the underside of vehicle 502 when in its lifted or raised position, the operator may choose to lower vehicle 502 all the way to the ground. To do so, the operator may remove any additional supports disposed beneath vehicle by crawling or reaching underneath the vehicle and removing the supports. Next, the operator may lower the vehicle all the way to the ground by engaging the HI-LIFT jack 202 handle 216 until the vehicle touches the ground level. Afterwards, the operator may easily withdraw the HI-LIFT jack 202 and attached lever adapter device 101.

Turning to FIG. 7, FIG. 7 shows lever adapter device 101 with support legs 102 and 104 in alignment (i.e. closed position) with each other. Further, FIG. 7 illustrates jack attachment piece 116 rotated to a horizontal flat position (as opposed to an upright vertical position as shown in FIGS. 1A and 1B). Lever adapter device 101 may be used in the arrangement shown in FIG. 7 when an operator needs to stow and store lever adapter device 101 when not in use. Thus, FIG. 7 shows one of the many benefits of lever adapter device 101, which is that lever adapter device 101 is a tool that may be stowed and stored so as to take up a minimal amount of room.

It is noted that, in some circumstances, an operator of lever adapter device 101 may desire to use lever adapter device 101 to lift a vehicle, such as vehicle 502, while support legs 102 and 104 are in the closed position as shown in FIG. 7. Accordingly, lever adapter device 101 may be successfully used to raise a vehicle while support legs 102 and 104 are in straight alignment with each other (as opposed to being spread apart in an angled arrangement as shown, for example, in FIGS. 1A and 1B).

Referring to FIG. 8, FIG. 8 shows an alternative method of using lever adapter device 101. As shown in FIG. 8, lever adapter device 101 is inverted in a concave up position. In certain scenarios, a vehicle or other heavy object (e.g. object 802) may have a smaller clearance, such as clearance 802. Thus, an operator of lever adapter device 101 may need to invert lever adapter device 101 such that lever adapter device 101 has a thinner profile and can accommodate the smaller clearance 804. As shown in FIG. 8, portions of the top surfaces of support legs 102 and 104 (e.g. top surfaces 136) may make contact with the ground surface 702.

FIG. 8 shows that lever adapter device 101 is coupled to HI-LIFT jack 202. In the scenario depicted in FIG. 8, lever adapter device 101 may be coupled to HI-LIFT jack 202 in accordance with one or more steps previously described. For example, position locking pin 119 (or another fastener) may be used to couple jack attachment piece 116 to runner 204 of HI-LIFT jack 202. Afterwards, an operator may slide HI-LIFT jack 202 and the attached inverted lever adapter device 101 (as shown in FIG. 8) beneath an underside of object 802. Alternatively, an operator may initially invert lever adapter device 101 such that support legs 102 and 104 are flipped over whereby their top surfaces 126 are touching the ground level 702, and slide lever adapter device 101 beneath object 802. Then, the operator may couple HI-LIFT jack 202 to the inverted lever adapter device 101 using one or more techniques described above. As shown in FIG. 8, an operator may also operably engage base plate 140 beneath HI-LIFT jack 202, and operably couple strap 150 to base plate 140 using one or more techniques described above, to provide additional sturdiness and stability when using lever adapter device 101.

FIG. 8 may be useful in some unique scenarios whereby lever adapter device 101 may be used for lifting a load (e.g. object 802) onto an elevated location or lowering down the load from an elevated location, such as a loading dock or stairs. To do so, in one or more embodiments, the stabilizing feet (e.g. 106 and 108) of lever adapter device 101 may be placed on the elevated location and the load may be placed on the legs (e.g. support legs 102 and 104) in the same flipped position as shown in FIG. 8. When the jack (e.g. HI-LIFT jack 202) has lifted or lowered the load, the load may simply be pushed off of support legs 102 and 104 to its desired location.

It is an intended objective of the present description to show that lever adapter device 101, in accordance with one or more embodiments, is extremely versatile and may have a variety of applications. Referring to FIG. 9, lever adapter device 101 is shown coupled with scissor jack lift 902. In one or more embodiments, the jack attachment piece 116 may be detached from the hinged support legs 102 and 104, such that lever adapter device 101 has an upper surface 903 without a jack attachment piece 116. Then, a top surface 904 of scissor jack lift 902 may be coupled to the upper surface 902 of lever adapter device 101 as shown in FIG. 9. In alternative embodiments, an operator does not need to detach jack attachment piece 116 from lever adapter device 101 to couple lever adapter device 101 to a scissor jack lift, such as scissor jack lift 902. Further, a base plate, such as base plate 140 shown in FIG. 1C and FIG. 1D may be coupled to a bottom surface of scissor jack lift 902. In addition, scissor jack lift 902 may push from the bottom using a positive locking device (not shown).

Referring to FIG. 10, FIG. 10 depicts an embodiment whereby lever adapter device 101 may be coupled to a Jaws of Life tool (i.e. Jaws of Life tool 1002). As described herein, a Jaws of Life tool may be a type of rescue tool, known to those skilled in the art, including emergency rescue personnel. Jaws of Life tools may be hydraulic rescue tools used to assist vehicle extrication of crash victims, as well as other rescues from small spaces. These tools may include cutters, spreaders, and rams, and may also be powered by a hydraulic pump (not shown), which can be hand, foot, or engine powered. In one or more embodiments, lever adapter device 101 may be used when implementing a Jaws of Life tool, such as Jaws of Life tool 1002 to extract crash victims from one or more vehicles or other scenarios. In one embodiment, a pivot cup or stirrup (not shown) may be used where the pivot cup or stirrup positive locks to the top bar 120 of jack attachment piece 116. Further, a base plate, such as base plate 140, may be coupled to a bottom surface of Jaws of Life tool 1002. Additional embodiments may be envisioned by those of ordinary skill in the art.

Turning to FIG. 11, FIG. 11 depicts another method and use for implementing lever adapter device 101. In FIG. 11, lever adapter device 101 may be coupled (e.g. via position locking pins) to a lever, such as lever 1102. Lever 1102 is shown in FIG. 11 may be coupled to and balancing on fulcrum 1104.

There are times where an operator of lever adapter device 101 may not be in possession or have easy access to the various specialized jacks useful in lifting vehicles or other heavy objects, such as HI-LIFT jack 202 and scissor jack 902 as described above. In such a situation, a lever (or bar) such as lever 1102, disposed over fulcrum may suffice to quickly and safely lift a vehicle or other object. Accordingly, an operator may couple lever adapter device 101 to lever 1102 by coupling jack attachment piece 116 to a body of lever 1102. In one embodiment, lever 1102 may include a designated slot (not shown) for inserting a position locking pin, such as position locking pin 119 into the slot of lever 1102 and also through the designated slot located in the frame 122 of jack attachment piece 116.

Afterwards, the operator (with or without the assistance of other individuals) may determine a suitable location beneath a vehicle or other object for sliding the lever adapter device 101 beneath the vehicle or other object. Then, the operator may apply force to the free end of lever 1102 to cause lever adapter device 101 to raise the vehicle or other object such that the support legs 102 and 104 make contact with an underside of the vehicle or other object. If one applies sufficient force to the end of lever 1102, he or she should be able to at least nominally and minimally raise the vehicle or other object to provide some space for the operators of lever adapter device 101 to access the underside of the raised vehicle or other object. Thus, the embodiment shown in FIG. 11 is shown to illustrate that there may be scenarios where lever adapter device 101 may still be useful (particularly in emergency rescue operations where it is critical to access trapped individuals as quickly and as safely as possible) even if a HI-LIFT jack 202 or other type of jack is not presently available.

Referring to FIG. 12, FIG. 12 provides a flowchart of a process in accordance with one or more embodiments for using a lever adapter device 101. Specifically, FIG. 12 provides a flowchart for using a lever adapter device, such as lever adapter device 101, in conjunction with a HI-LIFT jack such as HI-LIFT jack 202 shown in FIG. 2. It is noted that one or more steps described in FIG. 12 may be performed out of the order described in FIG. 12. Further, lever adapter device 101 may be implemented in a variety of ways not described in FIG. 12.

As an initial step, the positioning of a first support leg and a second support leg (e.g. support legs 102 and 104) of a lever adapter device may be adjusted to the desired position (step 1202). As previously described, position locking pins may be used to lock support legs 102 and 104 in position. Thus, support legs 102 and 104 may be positioned in a spread apart position (in any desired angle or arrangement) or may be positioned so as to be in straight alignment with each other (e.g. as illustrated in FIG. 7).

Next, an operator may securely couple a lever adapter device (in accordance with one or more embodiments as described herein) to a HI-LIFT jack, such as HI-LIFT jack 202 (step 1204). This step may include coupling the frame 122 of jack attachment piece 116 to a runner 204 of HI-LIFT jack 202. In one or more embodiments, the operator may, subsequent to securing the lever adapter device 101 to HI-LIFT jack 202, position the first support leg and second support leg beneath an underside of an object to be lifted by sliding the first support leg and second support leg of the lever adapter device beneath the object (step 1206). Alternatively, the operator may position the support legs of a lever adapter device beneath the object, and then once that has been successfully completed, securely couple the HI-LIFT jack to the exposed jack attachment piece of the lever adapter device.

A process of using lever adapter device 101 may continue whereby an operator engages a handle of a HI-LIFT jack to raise the object to be lifted to a desired height (step 1208). At step 1208, the HI-LIFT jack is securely coupled to the lever adapter device. As the operator continues to lift the object, the top surfaces of the first and second support legs of a lever adapter device make contact with the underside of the lifted object, and thus act as stabilizing supports (step 1210).

An operator may continue to raise the lifted object by engaging the handle of the HI-LIFT jack. If the desired height is not reached, the operator continues to engage the handle of the HI-LIFT jack. However, upon reaching the desired height (step 1212), the operator may then proceed to put one or more lift supports (e.g. vehicle lift stands) in a variety of optimal locations beneath the lifted object (step 1214).

Next, the operator may proceed to lower the object onto the lift supports by engaging the handle of the HI-LIFT jack to lower the object (step 1216). In one scenario, the process illustrated in FIG. 12 may end with the object being lowered onto the lift supports. However, as previously described, an operator may perform additional steps subsequent to step 1216. For example, an operator may choose to withdraw the HI-LIFT jack that is attached to the lever adapter device, simply by pulling backwards on a body of the HI-LIFT jack, which effectively pulls the HI-LIFT jack and the lever adapter device out from under the vehicle. The operator may alternatively, keep the lever adapter device located beneath the lowered object to act as an additional support on its own. If so, the operator may choose to detach the HI-LIFT jack from the lever adapter device. This technique has previously been described above.

Additional combinations and various uses may be provided by lever adapter device 101. In some embodiments, an optional attachment (not shown) may be used on a top surface (e.g. top surface 136) of support legs 101 and 102 that would slide backwards as the load or object to be lifted is raised. Such an optional attachment may, without limitation thereto, comprise spikes or a positive lock fastened to the load attached and sliding on the support legs 102 and 104 of lever adapter device 101.

In some embodiments, support legs 102 and 104 may be configured to have longer lengths and to have a different curve configured to accommodate higher ground clearance vehicles, such as four-by-fours and trucks. Further, an accessory plate (not shown) may be welded or bolted to a frame of a vehicle, which may optionally be used with the longer length legs to accommodate for the typical distance (8 to 12 inches) of the frame from the rocker panel in truck type vehicles. The accessory plate would stick out towards the side of the vehicle and the lever adapter device would fit within it to provide the leg with a closer contact point.

In some embodiments, support legs 102 and 104 of lever adapter device 101 may not be curved, but may instead be formed as straight and flat legs. In such embodiments, the flat, straight legs (e.g. alternative configurations of support legs 102 and 104) may be used to lift and move loads (e.g. vehicles or other heavy objects) laterally. In some examples, this embodiment of the flat, straight support legs may be used to lift ecology blocks, such as those used to separate traffic or cordon off areas and build upon each other to make a wall. Such an embodiment of straight support legs may also be used for low-level maneuvering or adjustment of such blocks that are usually moved by forklift or a specific type of machinery. Further, such straight legs on a lever adapter device, such as lever adapter device 101, may be helpful in vehicle accidents sites that involve blocks and the like often placed along the road.

As previously described, stabilizing feet 106 and 108 may be attached at the end of support legs 102 and 104 to contact the ground to minimize slippage. In some examples, optional attachments for different feet for 106 and 108 may accommodate different types of ground surface, such as dirt, mud, sand, and pavement. In some examples, stabilizing feet 106 and 108 may be configured to rest on two by fours (2×4's) or four by fours (4×4's) to accommodate use on vehicles with higher ground clearance. Strap 150 may also be located by the feet and may be configured to allow the user to strap HI-LIFT jack 202 to lever adapter device 101 to prevent the base from kicking out.

Lever adapter device 101 may have a number of other uses, such as to lift a load tethered from below. For example, lever adapter device 101 may lift a car engine a couple of inches by placing lever adapter device 101 on the top of the engine compartment of the vehicle. Lever adapter device 101 may be used for auto wrecking yards in place of a fork lift to raise vehicles up and place on old wheel rims under the vehicle for access. In addition to the above, lever adapter device 101 may be used to span an opening, such as a trench or a high directional (a point above the load to connect a hauling system), for rope rescue. Furthermore, lever adapter device 101 may be used as a stabilizer to shore up collapsed entrances, walls, and objects in precarious positions.

Additionally, lever adapter device 101 may be used as a class 1 lever by flipping the device (to concave curve facing up) and placing the load on the toes. The base secured jack in the lowering function may raise the load. Furthermore, support legs 102 and 104 that are flipped with the concave curve facing up may also be used to lower the center of gravity and used for reduced clearance issues (as shown and as described for FIG. 8).

In some embodiments, the jack attachment and legs may be configured to meet at a hinge. The hinge may be configured with positioning pins to lock in place the positioning of the legs and the jack attachment. In some embodiments, a pin may be configured to release the positioning of the legs by pulling on the pin. When the pin is inserted, the positioning of the legs may be locked in place. Additionally, the same or another pin may be configured to release the positioning of the angle of the jack attachment relative to the hinge and legs. In some embodiments, a pin may be configured to release the positioning of the jack attachment by pulling on the pin. Using the pins, a user may manipulate the positioning of the legs and jack attachment so that the lever adapter device may lie horizontally or vertically flat in the storage position for easy storage and transportation. In addition, the pins allow the user to easily manipulate the legs and jack attachment from storage position to deploy position ready for lifting a vehicle. In some embodiments, the deploy position includes spreading the legs, placing the legs horizontally along the ground, and the jack attachment angled vertically to allow insertion of a high lift jack. The legs may be spread at variable angles.

Beneficially, embodiments of a lever adapter device as described herein may assist an operator in raising or lifting a vehicle or heavy object faster, higher, and in a safer manner than the methods and mechanisms presently available. The lever adapter device, in accordance with one or more embodiments described herein, is a portable and universal device that may be utilized by anyone to lift a vehicle quickly and safely. Further, the lever adapter device, in accordance with embodiments described herein, reduces the load on a jack that is used when lifting a vehicle or other heavy object. The lever adapter device may be particularly helpful for rescue personnel in situations where the driver and passengers of a vehicle need to be extracted from a variety of different types of vehicles in emergency situations. The lever adapter device may also be used for vehicles on their side or top.

Further, a lever adapter device, as described above, adds a significant amount of support and stability that does not exist with presently available mechanisms. Another notable feature of lever adapter device is that lever adapter device allows individuals (especially firefighters and other emergency rescue responders) to confidently and safely lift vehicles or other loads without needing bulky and complication additional pieces of equipment or the assistance of multiple people. Further, a lever adapter device, as designed and described herein, may be used in an original or inverted position as needed. There are numerous uses and applications for a lever adapter device in accordance with the numerous embodiments as described above.

The above-described Figures illustrate the architecture, functionality, and operation of possible implementations of the invention described in the present description according to various embodiments. The detailed description of the illustrative embodiments above is described in sufficient detail to enable those skilled in the art to practice the invention. To avoid unnecessary detail, the description may have omitted certain information known to those skilled in the art.

While the present invention has been related in terms of the foregoing embodiments those skilled in the art will recognize that the invention is not limited to the embodiments described. The present invention may be practiced with modification and alteration within the spirit and scope of the appended claims. Thus, the description is to be regarded as illustrative instead of restrictive on the present invention.

What is claimed is:

1. A lever adapter device for use in lifting a vehicle or other heavy objects, comprising:
   one or more stabilizing feet, wherein each of the one or more stabilizing feet has a frame that defines an opening;
   one or more support legs, wherein one of each of the one or more stabilizing feet is attached to a distal end of each support leg, wherein each of the one or more support legs are elongated curvilinear members having a proximate end and the distal end, wherein each of the one or more support legs comprises:
- a body having a bottom surface and a top surface, wherein the top surface has an upwardly angling portion and a downwardly angling portion, such that the top surface tapers upwardly at an angle to a highest point, and then tapers downwardly at an angle, such that the top surface and bottom surface meet at a terminal end of each support leg;
- one or more hinges disposed at the terminal end of each support leg, wherein each support leg is connected to the one or more hinges at the terminal end of each support leg, such that each support leg is extendable and retractable towards or away from the other one or more support legs; and
- a jack attachment piece, wherein the jack attachment piece has a frame that defines a central opening, the frame further comprising a number of slots configured to receive position locking pins that extend through the frame and through the central opening of the jack attachment piece,
- wherein the jack attachment piece is configured to be removeably connected to a jack or to other lifting devices in order to assist in lifting the vehicle or the other heavy objects.

2. The lever adapter device of claim 1, wherein the one or more stabilizing feet prevent slipping of the one or more support legs and provide additional grip on a ground level surface.

3. The lever adapter device of claim 1, wherein each of the one or more support legs are straight and flat rather than curved.

4. The lever adapter device of claim 1, wherein the jack attachment frame is detachably coupled to the one or more support legs.

5. The lever adapter device of claim 1, wherein the jack attachment piece is adapted to connect to the runner of the HI-LIFT jack, such the jack attachment piece is positionable over an upper surface of the runner, and one of the position locking pins of the jack attachment piece is inserted through the slot on the underside of the runner and through the frame of the jack attachment piece.

6. The lever adapter device of claim 1, wherein the lever adapter device is configured to be used to lift the vehicle or the other heavy objects during emergency rescue operations including assisting individuals trapped by the vehicles or the other heavy objects.

7. The lever adapter device of claim 1, further comprising a base plate, the base plate having a front portion, a center portion, and a rear portion, wherein the front portion defines a first opening, the rear portion defines a second opening, and the center portion is disposed in between the first and second opening.

8. The lever adapter device of claim 1, further comprising a strap having a first end and a second end.

9. The lever adapter device of claim 8, wherein the first end of the strap is connectable to one of the one or more stabilizing feet, such that the first end of the strap is attachable through a first opening of the base plate by being looped over a front bar disposed on the front portion of the base plate, wherein the first end of the strap is then connectable to one stabilizing foot and the second end of the strap is connectable to another stabilizing foot.

10. A lever adapter device for use in lifting a vehicle or other heavy objects, comprising:
- one or more stabilizing feet, wherein each of the one or more stabilizing feet has a frame that defines an opening;
- one or more support legs, wherein one of each of the one or more stabilizing feet is attached to a distal end of each support leg, wherein each of the one or more support legs are elongated straight members having a proximate end and the distal end;
- one or more hinges disposed at the terminal end of each support leg, wherein each support leg is connected to the one or more hinges at the terminal end of each support leg, such that each support leg is moveable towards or away from the other one or more support legs; and
- a jack attachment piece, wherein the jack attachment piece has a frame that defines a central opening, the frame further comprising a number of slots configured to receive position locking pins that extend through the frame and through the central opening of the jack attachment piece,
- wherein the jack attachment piece is configured to be removeably connected to a jack or to other lifting devices in order to assist in lifting the vehicle or the other heavy objects.

11. The lever adapter device of claim 10, wherein the jack attachment piece is adapted to connect to the runner of a HI-LIFT jack, such that the jack attachment piece is positionable over an upper surface of the runner, and one of the position locking pins of the jack attachment piece is inserted through the slot on the underside of the runner and through the frame of the jack attachment piece.

12. A method of using a lever adapter device with a HI-LIFT jack when lifting a vehicle or a heavy object, the method comprising:
- (a) adjusting a positioning of a first support leg with respect to a second support leg disposed on the lever adapter device in a desired arrangement, wherein the first support leg and a second support leg are elongated members, the lever adapter device further comprising a first foot connected to a distal end of the first support leg, a second foot connected to a distal end of the second support leg, one or more hinges that connect to the first support leg and the second support leg, and a jack attachment piece connectable to the one or more hinges, wherein the first support leg and the second support leg are configured to moveable with respect to each other, wherein the first support leg and the second support leg are connectably joined together by the one or more hinges;
- (b) securing the lever adapter device to the HI-LIFT jack;
- (c) positioning the first support leg and the second support leg of the lever adapter device beneath the vehicle or the heavy object such that the first support leg and the second support leg are perpendicular to an underside of the vehicle or heavy object, and a bottom surface of the first support leg and a bottom surface of the second support leg is contacting a ground surface;
- (d) upon positioning the first support leg and the second support leg beneath the underside of the vehicle or the heavy object, engaging a handle of the HI-LIFT jack to raise the vehicle or the heavy object to a desired height, wherein the HI-LIFT jack is securely coupled to the lever adapter device, and wherein the HI-LIFT jack is located proximate to the vehicle or the heavy object and to the first and second support leg of the lever adapter device;

(e) responsive to raising the vehicle or the heavy object to the desired height, supporting the underside of the vehicle or the heavy object with a top surface of the first support leg and a top surface of the second support leg, wherein the top surfaces of the first support leg and the second support leg make physical contact with a portion of the underside of the vehicle;

(f) upon reaching the desired height of the vehicle, placing lift supports in place under a lifted side of the vehicle or the heavy object; and lowering the vehicle or the heavy object onto the lift supports by engaging the handle of the HI-LIFT jack to lower the vehicle or the heavy object.

13. The method of claim 12, further comprising, upon lowering the vehicle or the heavy object onto the lift supports, withdrawing the HI-LIFT jack and the lever adapter device by pulling the body of the HI-LIFT jack backwards and away from the vehicle or the heavy object.

14. The method of claim 12, further comprising, upon lowering the vehicle or the heavy object onto the lift supports, stabilizing the lever adapter device beneath the underside of the vehicle or the heavy object and disconnecting the HI-LIFT jack from the lever adapter device.

15. The method of claim 12, wherein securing the lever adapter device to the HI-LIFT jack further comprises:
(a) removing one or more position locking pins from one or more slots extending through a frame of the jack attachment piece;
(b) disposing the jack attachment piece onto an upper surface of a runner of the HI-LIFT jack, such that a portion of the jack attachment piece makes engageable contact with the upper surface of the runner of the HI-LIFT jack;
(c) inserting a position locking pin of the one or more position locking pins of the jack attachment piece through a slot disposed on a runner of the HI-LIFT jack; and
(d) upon inserting the position locking pin through the slot disposed on the runner of the HI-LIFT jack, also inserting the position locking pin through the slot in the frame of the jack attachment piece.

16. The method of claim 12, wherein securing the lever adapter device to the HI-LIFT jack further comprises:
(a) positioning a base plate under a beam of the HI-LIFT jack, wherein the base plate includes a frame that defines a first opening, a second opening, and a center portion adapted for receiving the beam of the HI-LIFT jack; and
(b) connecting a strap to the base plate and to the first foot and the second foot such that the strap forms a triangle shape when connected to the base plate and to the first foot and to the second foot.

17. The method of claim 14, wherein stabilizing the lever adapter device beneath the underside of the vehicle and disconnecting the HI-LIFT jack from the lever adapter device further comprises:
(a) disconnecting the HI-LIFT jack from the lever adapter device while the lifted vehicle or heavy object is located on the vehicle supports;
(b) pulling the HI-LIFT jack away from the lifted vehicle or the heavy object; and
(c) inserting a support rod in a designated location on the base plate, wherein the support rod contacts the underside of the lifted vehicle or the heavy object and acts as a supporting element for the lifted vehicle.

18. The method of claim 12, further comprising preparing the lever adapter device for storing in a stowed position by bringing the first support leg and the second support leg in alignment with each other.

19. The method of claim 12, further comprising inverting the lever adapter device, and then sliding the lever adapter device in its inverted position for inserting beneath the vehicles or the other heavy objects that have a smaller clearance and require a thinner profile.

20. The method of claim 12, further comprising removing the HI-LIFT jack in order to couple the lever adapter device to a scissor lift jack, a jaws of life, or a lever.

\* \* \* \* \*